(12) United States Patent
Takenaka

(10) Patent No.: US 12,069,018 B2
(45) Date of Patent: Aug. 20, 2024

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Shuichi Takenaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/074,181

(22) Filed: Dec. 2, 2022

(65) Prior Publication Data

US 2023/0208985 A1   Jun. 29, 2023

(30) Foreign Application Priority Data

Dec. 24, 2021   (JP) ................. 2021-210376

(51) Int. Cl.
*H04L 51/21* (2022.01)
*G06F 16/16* (2019.01)

(52) U.S. Cl.
CPC .............. *H04L 51/21* (2022.05); *G06F 16/16* (2019.01)

(58) Field of Classification Search
CPC ... H04L 67/1097; H04L 67/06; G06F 16/168; G06F 16/11; G06F 21/6218; G06F 16/1734; G06F 16/122; G06F 16/13; G06F 16/182; G06F 16/16
See application file for complete search history.

(56) References Cited

U.S. PATENT DOCUMENTS

| | | | | |
|---|---|---|---|---|
| 9,680,779 | B2* | 6/2017 | Marovets ................ | H04L 51/08 |
| 10,057,366 | B2* | 8/2018 | Su ...................... | H04B 7/18578 |
| 10,491,396 | B2* | 11/2019 | Uhr ....................... | G06F 21/645 |
| 11,650,772 | B2* | 5/2023 | Saito ...................... | G06F 3/126 |
| | | | | 709/201 |
| 2005/0267938 | A1* | 12/2005 | Czeczulin ............ | G06Q 10/107 |
| | | | | 709/206 |
| 2006/0080336 | A1* | 4/2006 | Zhang ...................... | G06F 8/36 |
| 2007/0168877 | A1* | 7/2007 | Jain ..................... | G06F 3/04842 |
| | | | | 715/772 |
| 2008/0098005 | A1* | 4/2008 | Goradia ............. | G06F 16/9535 |
| 2008/0114741 | A1* | 5/2008 | Yaojie ................. | G06F 16/9032 |
| 2008/0208867 | A1* | 8/2008 | Poston ................. | G06F 16/958 |
| | | | | 707/999.009 |
| 2009/0094537 | A1* | 4/2009 | Alber .................. | H04L 12/1827 |
| | | | | 715/758 |
| 2010/0217988 | A1* | 8/2010 | Johnson ................. | G06F 16/93 |
| | | | | 713/168 |
| 2012/0253990 | A1* | 10/2012 | Skala ..................... | G06Q 30/02 |
| | | | | 370/352 |
| 2013/0259028 | A1* | 10/2013 | Skala ..................... | G06Q 30/06 |
| | | | | 370/352 |

(Continued)

FOREIGN PATENT DOCUMENTS

JP   2021-043717   3/2021

*Primary Examiner* — Ninos Donabed
(74) *Attorney, Agent, or Firm* — Venable LLP

(57) ABSTRACT

According to an aspect of the present disclosure, a method of controlling an information processing apparatus comprises receiving identification information of a first message from a server providing a chat function, obtaining the first message identified by using the identification information, and generating a file in a predetermined format based on information of the first message.

16 Claims, 20 Drawing Sheets

(56) References Cited

U.S. PATENT DOCUMENTS

| | | | | |
|---|---|---|---|---|
| 2014/0006061 A1* | 1/2014 | Watanabe | ............... | G06Q 40/08 |
| | | | | 705/4 |
| 2014/0189022 A1* | 7/2014 | Strumwasser | ......... | G06Q 10/10 |
| | | | | 709/224 |
| 2015/0149153 A1* | 5/2015 | Werth | ..................... | G06F 40/30 |
| | | | | 704/9 |
| 2015/0271118 A1* | 9/2015 | Nudel | ..................... | H04L 51/08 |
| | | | | 709/206 |
| 2016/0103897 A1* | 4/2016 | Nysewander | ......... | G06F 16/254 |
| | | | | 707/602 |
| 2018/0089153 A1* | 3/2018 | Sato | ..................... | G06F 40/151 |
| 2018/0300507 A1* | 10/2018 | Uhr | ..................... | H04L 63/123 |
| 2018/0337787 A1* | 11/2018 | Uhr | ..................... | G06Q 20/02 |
| 2018/0365448 A1* | 12/2018 | Uhr | ..................... | G06Q 20/36 |
| 2019/0020485 A1* | 1/2019 | Uhr | ..................... | G06Q 50/18 |
| 2019/0179800 A1* | 6/2019 | Sato | ..................... | G06F 16/116 |
| 2020/0099637 A1* | 3/2020 | Kurokawa | ......... | H04N 1/00875 |
| 2020/0133592 A1* | 4/2020 | Mitsuhashi | ............. | H04L 51/02 |
| 2021/0144264 A1* | 5/2021 | Toda | ..................... | H04L 51/224 |

* cited by examiner

FIG. 6A

```
{                                                                    ⎯T100
  "@odata.context" : "https://xxxxxx/{TeamID}/{ChannelID}/{MessageID}/$entity",
  :
  "messageType" : "message",
  "createdDateTime" : "YYYY-MM-DD HH:MM:SS",
  "messageId" : {MessageID},  ⎯⎯T101
  "webUrl" : "https://xxxxxx/ {TeamID}/ {ChannelID}/ {MessageID}",
  "from" : {
     "user" : {
        "id" : {UserID},
        "displayName" : "User A"
     }
  },
  "body" : {
     "contentType" : "html",                                          ⎯T102
     "content" : "<div>THIS IS A DOCUMENT FOR THE MEETING.
                 <img src=" image.png" >
                 </ div>"
  },
  "channelIdentity": {
     "teamId" : " {TeamID}",
     " channelId" : " {ChannelID}"
  },
  " attachments" : [                                                  ⎯T103
     {
       id: {AttachmentID},
       contentUrl: "https:/ /AAAA",
       name: "AAA.pptx"
     }
  ],
  "reactions" : [
     {
        "reactionType" : "nice",                                      ⎯T104
        "createdDateTime" : "YYYY - MM- DD HH:MM:SS",
        "user" : {
            "id" : {UserID},
            "displayName" : "User B"
        }
     }
  ]
}
```

FIG. 6B

```
                                                             ┌─ T200
{
  "@odata.context" : "https://xxxxxx/ {TeamID}/ {ChannelID}/ {(parent)MessageID}/ replies/ $entity",
  :
  "messageType" : "message",
  "createdDateTime" : "YYYY- MM- DD HH:MM:SS",
  "messageId" : {MessageID},     ├--- T201
  "webUrl" : "https://xxxxxx/ {TeamID}/ {ChannelID}/ {MessageID}",
  "from" : {
     "user" : {
        "id" : {userID},
        "displayName" : "User B"
     }
  },
  "body" : {
     "contentType" : "html",
     "content" : "<div>THANK YOU.</ div>"
  },
  "channelIdentity" : {
     "teamId" : "{TeamID}",
     "channelId" : "{ChannelID}"
  },
  "attachments" : [ ],
  "reactions" : [
     {
        "reactionType" : "nice",
        "createdDateTime" : "YYYY- MM- DD HH:MM:SS",
        "user" : {
           "id" : {userID},
           "displayName" : " User A "
        }
     }
  ]
}
```

```
{
  "@odata.context" : " https:// xxxxxx/ {TeamID}/ {ChannelID}/ {(parent)MessageID}/ replies/ $entity",
  :
  "messageType" : "message",
  "createdDateTime" : "YYYY- MM- DD HH:MM:SS",
  "messageId" : {MessageID},
  "webUrl" : "https:/ / xxxxxx/ {TeamID}/ {ChannelID}/ {messageID}",
  "from" : {
    "user" : {
      "id" : {UserID},
      "displayName" : "User C"
    }
  },
  "body" : {
    "contentType" : "html",
    "content" : "<div>THIS IS ANOTHER DOCUMENT FOR THE MEETING.</ div>"
  },
  "channelIdentity" : {
    "teamId" : "{TeamID}",
    "channelId" : "{ChannelID}"
  },
  "attachments" : [
    {
      id : {AttachementID},
      contentUrl : "https:/ / BBBB",
      name : "BBB.xlsx"
    }
  ],
  "reactions" : [ ]
}
```

```
{
  "@odata.context" : "https:/ /xxxxxx/ {TeamID}/{ChannelID}/{MessageID}/ messageAll/$entity",
  :
  "parentId": null,
  "messageId": {MessageID},
  :
  "parentId": {MessageID},
  "messageId": {MessageID},
  :
  "parentId": {MessageID},
  "messageId": {MessageID},
  :
}
```

FIG. 7

```
11 0 obj
<< /Type / Annot
/Subtype /Text
/Rect [266 116 430 204]
/Contents (Nice reaction by User A.)
>>
endobj
```

D100

INFORMATION PROCESSING APPARATUS, METHOD OF CONTROLLING INFORMATION PROCESSING APPARATUS, AND STORAGE MEDIUM

BACKGROUND

Field of the Disclosure

The present disclosure relates to an information processing apparatus, a method of controlling the information processing apparatus, and a storage medium for providing an output function to a service having a message posting function.

Description of the Related Art

In recent years, communication support tools (hereinafter referred to as "collaboration tools") cooperated with various cloud services have become popular. For example, the collaboration tools include Microsoft Teams®, Skype®, and Slack®.

The collaboration tools can be used in cooperation with chat-based communication services, services for sharing files on cloud storage, and services for printing with cloud-connected printers.

Japanese Patent Application Laid-Open No. 2021-43717 describes sharing a file with other users by a user uploading the file on a chat room via collaboration tools. The user can post text information in chat format, attach captured bitmap images or business documents, and share the bitmap images or business documents with other users.

Further, the chat-based communication services in collaboration tools are not only those that organize conversations in a one-to-one format but also an increasing number of those that can organize the course of the conversations on a tree structure in a threaded format for collaboration among a large group of people. Furthermore, some collaboration tools have a function that enables simple reaction replies by using simple icon images that show emotions in addition to text information as reaction information to a certain posting. It is also possible to download documents shared on the collaboration tool to individual environments.

However, with the conventional technology, if the documents shared on the collaboration tool are externally output, only the documents shared on the service can be externally output. Conventionally, the collaboration tools cannot externally output text sentences, bitmap images, and simple reaction reply information shared in chat format. Thus, if the collaboration tools only output the shared document, communication information included in conversation information recorded in chat format, bitmap images, and simple reaction reply information is missing. Therefore, if the user cannot refer to the collaboration tool, the user cannot refer to the information shared on the collaboration tool.

SUMMARY

According to an aspect of the present disclosure, a method of controlling an information processing apparatus comprises receiving identification information of a first message from a server providing a chat function, obtaining the first message identified by using the identification information, and generating a file in a predetermined format based on information of the first message.

Further features of the present disclosure will become apparent from the following description of exemplary embodiments with reference to the attached drawings.

BRIEF DESCRIPTION OF THE DRAWINGS

FIG. 6A illustrates the data structure of JSON data provided by the chat service.

FIG. 6B illustrates the data structure of JSON data provided by the chat service.

FIG. 6C illustrates the data structure of JSON data provided by the chat service.

FIG. 6D illustrates the data structure of JSON data provided by the chat service.

FIG. 7 illustrates an example showing a PDF description of an annotation attribute object.

DESCRIPTION OF THE EMBODIMENTS

The following is a description of the form in which the disclosure is to be implemented using the drawings.

<The System Configuration>

Figure 1:
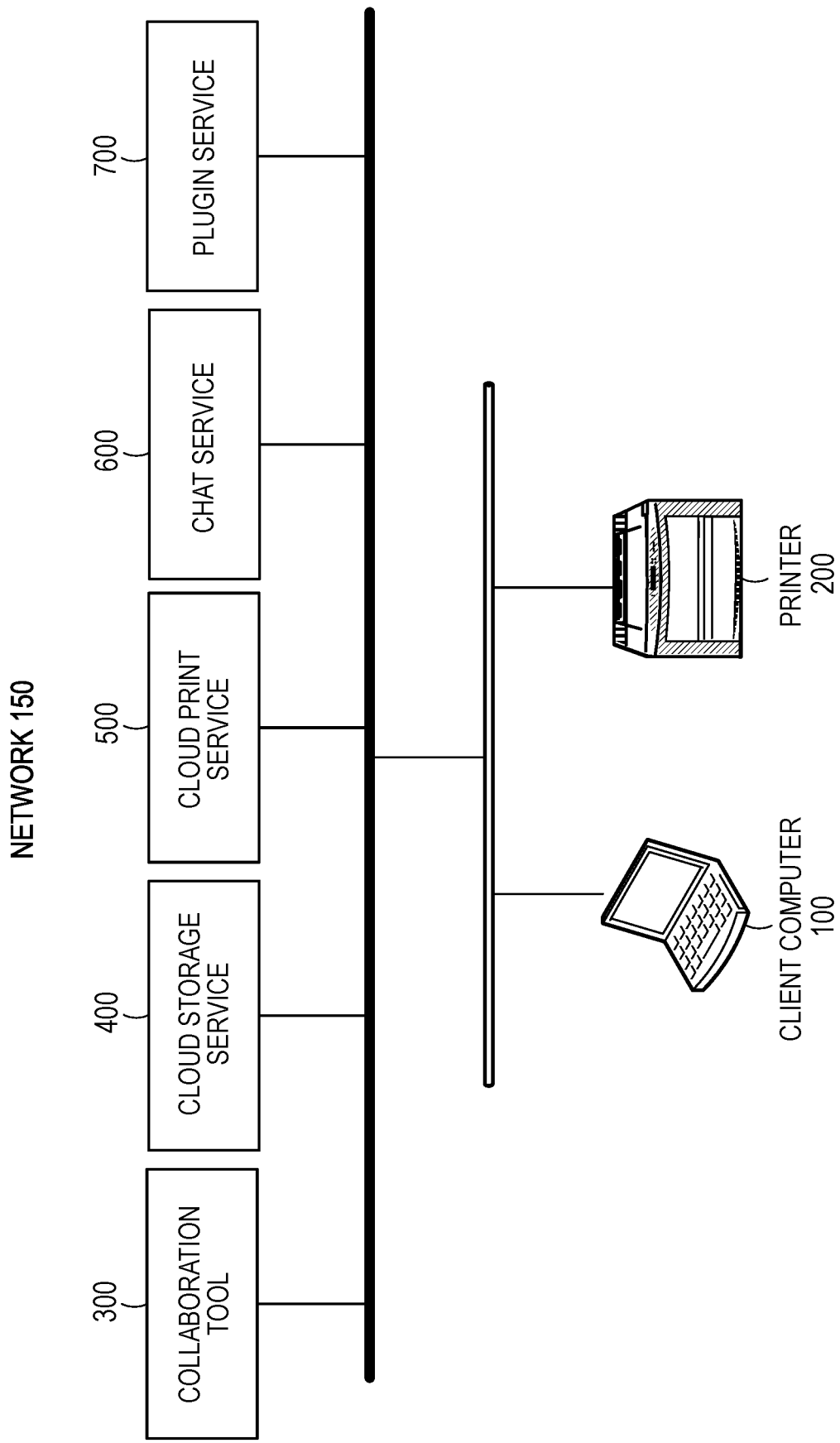
FIG. 1 illustrates an example showing a system configuration in the present embodiment.

FIG. 1 illustrates an example of a system configuration showing an embodiment of the present disclosure. The following describes a data exporting system for a threaded format communication service as a system in the present embodiment. The system in the present embodiment can collectively export data shared by business communication support tools that share text sentences, images, and files in a threaded format.

In a network 150, a client computer 100 and a printer 200 are communicably connected via an intranet, an internet, and the like. A plurality of client computers 100 and a plurality of printers 200 may be included in the network 150. For example, there may be other client computers 100 and other printers 200 connected to other intranets not shown, and the client computers 100 and the printers 200 may be communicably connected to the network 150 via the internet and the like.

A collaboration tool 300, a cloud storage service 400, a cloud print service 500, a chat service 600, and a plugin service 700 are connected to the network 150.

The collaboration tool 300 provides various collaboration functions. The collaboration tool 300 may be an application running on the client computer 100 or a cloud collaboration service operated in a web browser by accessing the collaboration tool 300 via the web browser on the client computer 100. The collaboration tool 300 is connected to and collaborated with the cloud storage service 400, the cloud print service 500, and the chat service 600 to provide functions such as chatting, data sharing, collaborative editing, web conferencing, printing, and the like. Further, the collaboration tool 300 includes a file-sharing function that allows users to share files uploaded from the collaboration tool 300 to the cloud storage service 400 via the chat service 600 with other users.

The cloud storage service 400 is a storage service built on the cloud including a plurality of servers (that is, on a server system) and located on the internet. The cloud storage service 400 is communicably connected to the intranet, and files on the cloud storage service 400 can be accessed from the client computers 100 via the internet. The users can upload files to the cloud storage service 400 and download files from the cloud storage service 400. The uploaded files on the cloud storage service 400 can be shared with other users. Restrictions on viewing, editing, and downloading of each file can be set for each user or group according to the settings by the user.

The cloud print service 500 is a cloud print service built on the cloud including a plurality of servers (that is, on a server system) located in the internet. In the present embodiment, the cloud print service 500 can be connected to each intranet and can be also connected to the client computer 100 and the printer 200 via the internet.

The chat service 600 is a service providing online communications by sharing text and bitmap images (image information). The chat service 600 can be used to upload files to the cloud storage service 400. URLs of the uploaded files are shared and the users can view and collaboratively edit the uploaded files within the system. The communication content between users is organized in a threaded format as a tree structure. Details of the tree structure of conversation in the threaded format and UI layout of the chat service 600 will be described in detail using FIGS. 4A and 4B.

The plugin service 700 is connected to the cloud storage service 400, the cloud print service 500, and the chat service 600, and serves as a bridge to the cloud communication service centered on the collaboration tool 300. The plugin service 700 performs communication control, data conversion, and data transmission between cloud services.

If the installation of the plugin service 700 is executed and completed on the collaboration tool 300, an output UI (such as an export menu U201 described later) is added to the UI (user interface) of the collaboration tool 300 to use the downloading and printing functions. For example, a processing instruction is transmitted to the plugin service 700 in response to instructions for downloading or printing by the users via the added output UI. Upon receiving the processing instructions, the plugin service 700 executes download processing, printing processing, and the like via the cloud print service 500. At that time, the plugin service 700 obtains message information (text information corresponding to the text in the body part, bitmap images) and simple reaction reply information from the chat service 600 and file information from the cloud storage service 400.

In the present embodiment, the client computer 100 refers to the UI of the collaboration tool 300 and accesses the cloud storage service 400, the cloud print service 500, and the chat service 600 to obtain various cooperation services.

In the present embodiment, as described above, the system configuration adopts the plugin service 700 placed in between cloud services as a cooperation bridge, but the system configuration may adopt the collaboration tool 300 including a role of the plugin service 700. The shared conversations on the chat service 600 are stored in the chat service 600 and shared documents are stored in the cloud storage service 400. If the printing is instructed from the client computer 100 to the collaboration tool 300, the instruction is transmitted to the printer 200 connected to the cloud print service 500 via the plugin service 700, and the converted print data is submitted to the printer 200 as a print job.

<The Hardware Block Diagram of the Plugin Service>

Figure 2:
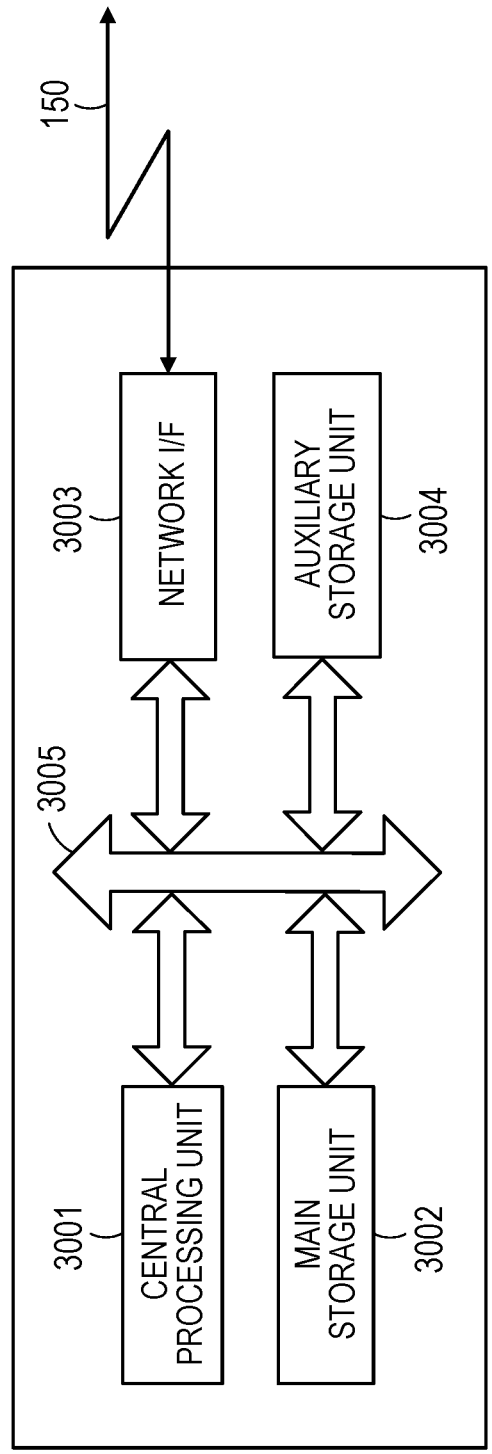
FIG. 2 illustrates a hardware block diagram of an information processing apparatus on which a plugin service is installed.

FIG. 2 illustrates a hardware block diagram showing the hardware configuration of the information processing apparatus including installed programs that describe processing contents of plugin service 700 according to the present embodiment.

A central processing unit 3001 loads programs stored in an auxiliary storage unit 3004 into a main storage unit 3002 and executes the programs. Further, the central processing unit 3001 integrally controls each device connected to a system bus 3005. The main storage unit 3002 functions as a main memory and a work memory of the central processing unit 3001.

The auxiliary storage unit 3004 stores an operating system (OS), various other control programs, and the like. For example, if the plugin service 700 is installed on the information processing apparatus, programs describing the processing contents of the plugin service 700 in the present embodiment are stored in the auxiliary storage unit 3004, and the central processing unit 3001 can execute the programs for the plugin service 700.

A network I/F 3003 is connected to the network 150 and is used for communications with devices outside of the collaboration tool 300. Programs can be installed in the auxiliary storage unit 3004 via the network I/F 3003.

A disk drive for a portable disk recording medium such as a CD or a DVD or a memory reader/writer for a portable nonvolatile recording medium such as a flash drive may be connected to the system bus 3005. For example, programs describing the processing contents of the plugin service 700 in the present embodiment are stored in the auxiliary storage unit 3004 via the portable storage medium and installed in the information processing apparatus.

In the present embodiment, the plugin service 700 is configured to perform the processing shown in FIG. 10, FIG. 11, and FIG. 12 described later by using the central processing unit 3001. However, the configuration is not limited to the foregoing configuration. For example, the central processing unit 3001 in the client computer 100 may perform the plugin service 700. In this case, the processing described in FIG. 10, FIG. 11, and FIG. 12 may be implemented in JavaScript®, PHP® format, and the like, stored in the collaboration tool 300, and accessed and executed by the client computer 100. Alternatively, the collaboration tool 300 may collectively perform the processing performed by the plugin service 700. In this case, the central processing unit 3001 of the collaboration tool 300 executes the processing performed by the plugin service 700.

The hardware configurations of the information processing apparatus that implements the collaboration tool 300, the cloud storage service 400, the cloud print service 500, and the chat service 600 in the present embodiment are also similar to the configurations shown in FIG. 2. The descriptions for the similar hardware configurations are omitted.

<The Software Block Diagram of the System>

Figure 3:
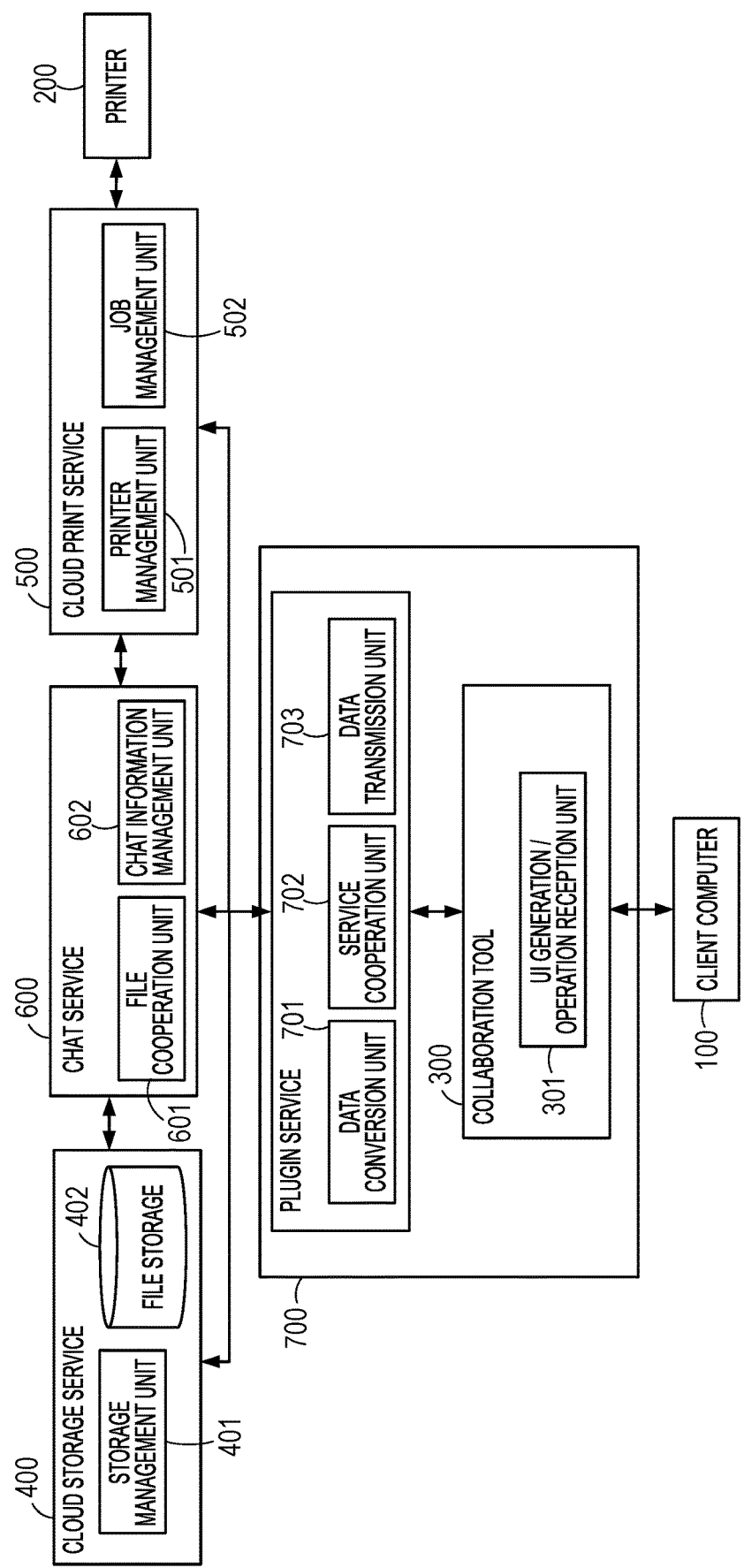
FIG. 3 illustrates a software configuration diagram showing the system in the present embodiment.
Figure 4A:
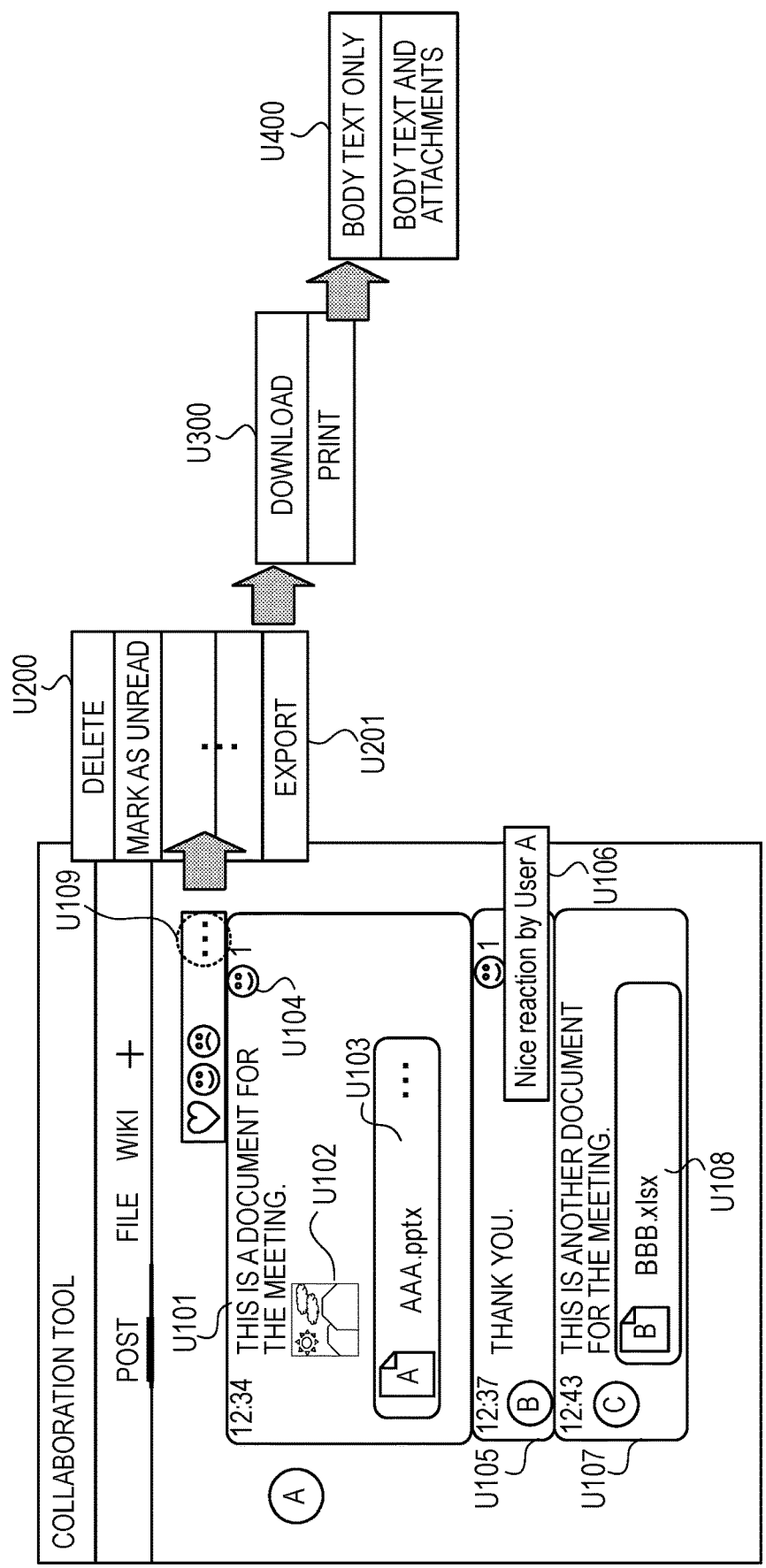
FIG. 4A illustrates the chat UI screen of the collaboration tool.
Figure 4B:
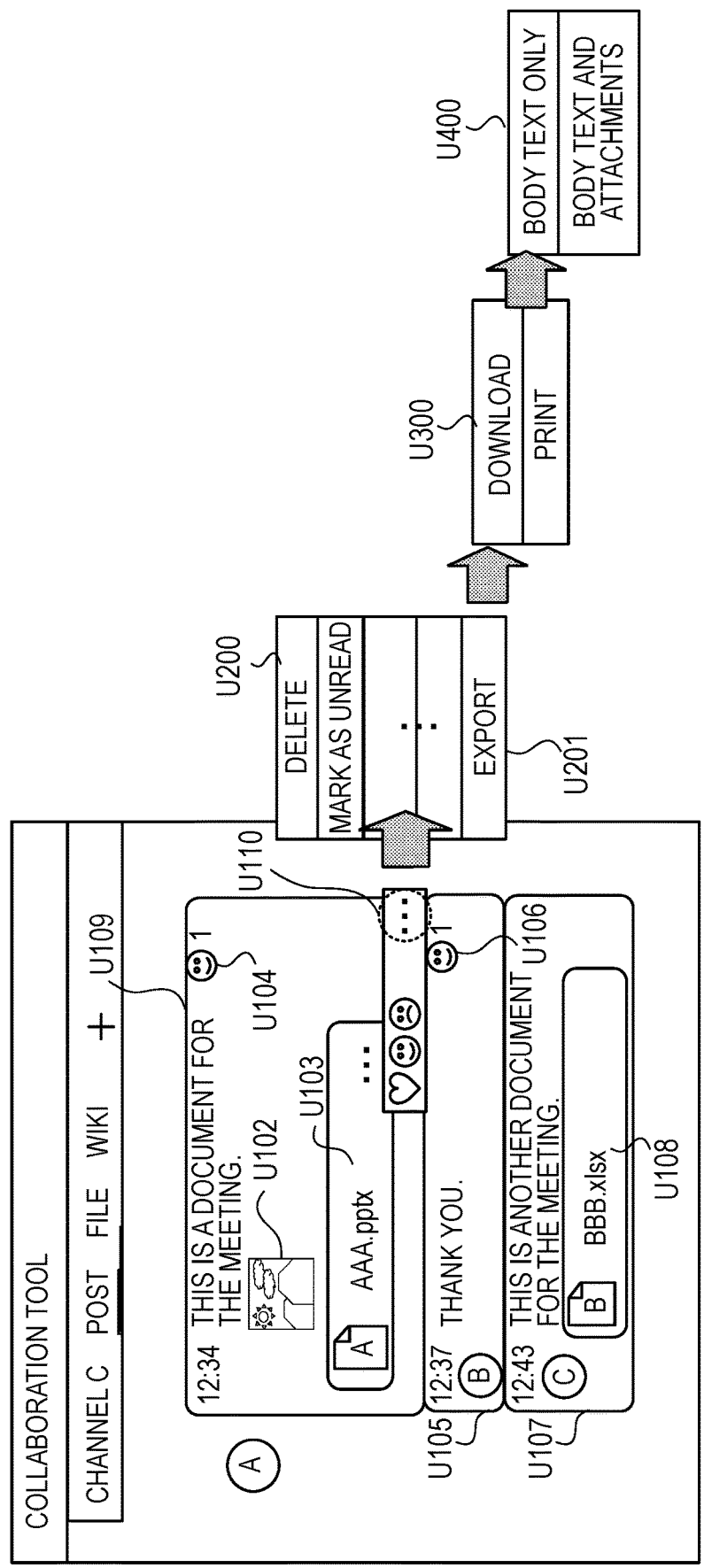
FIG. 4B illustrates the chat UI screen of the collaboration tool.

FIG. 3 illustrates a diagram showing an example of the software configuration of the system in the present embodiment. The collaboration tool 300 is a service including functions such as business chat and video calling via the internet, and various functions can be added to the collaboration tool 300. In the present embodiment, the collaboration tool 300 has a UI generation/operation reception unit 301. The UI generation/operation reception unit 301 generates UI screens as shown in FIGS. 4A and 4B, and receives operations via the client computer 100. The UI generation/operation reception unit 301 is realized, for example, by a central processing unit (not shown) of the collaboration tool 300 loading and executing programs stored in an auxiliary storage unit (not shown) into a main storage unit (not shown).

The cloud storage service 400 provides the storing and sharing service for files prepared in the cloud. In the present embodiment, the cloud storage service 400 includes a storage management unit 401 and a file storage unit 402. These software configurations are realized, for example, by a central processing unit (not shown) of the cloud storage service 400 loading and executing programs stored in an auxiliary storage unit (not shown) into a main storage unit (not shown).

The storage management unit 401 manages file information stored in the file storage unit 402 as a database (DB) together with file names, URLs, and the like. The file storage unit 402 stores files uploaded by the users to the cloud storage service 400.

The cloud print service 500 is a service located in the cloud via the internet, and provides functions related to printing. In the present embodiment, the cloud print service 500 includes a printer management unit 501 and a job management unit 502. These software configurations are realized, for example, by a central processing unit (not shown) of the cloud print service 500 loading and executing programs stored in an auxiliary storage apparatus (not shown) into a main storage unit (not shown). Note that the functions of the printer management unit 501 and the job management unit 502 may be in separate cloud print services cooperated with the cloud print service 500.

The printer management unit 501 generates and registers a printer queue if a printer registration instruction is received from a device corresponding to the cloud print service 500 or a virtual device application installed in the client computer 100. The registered printer queue is associated with printer identification information and managed by the printer management unit 501. The printer identification information includes attributes such as the location of the printer.

The job management unit 502 manages print jobs received from the plugin service 700. The received print job is stored once in a virtual printer queue (a storage area). According to output destination information received from the plugin service 700, the job management unit 502 copies the print job from the virtual printer queue (the storage area) to the corresponding printer queue to transmit the print job to the corresponding printer. The printer queue is specified by the print job received from the plugin service 700 and the printer is associated with the printer queue specified by the print job in the cloud print service 500. The job management unit 502 converts the print job waiting in the virtual printer queue (storage area) into an appropriate format according to a print data format supported by the transmission destination printer, copies the converted print job to the corresponding printer queue, and transmits the converted print job. The job management unit 502 also manages the data used for printing, detailed setting data, and bibliographic information (file names, print dates and times, and the like).

The chat service 600 provides a chat communication service with conversation in the threaded format between users. In the present embodiment, the chat service 600 includes a file cooperation unit 601 and a chat information management unit 602. These software configurations are realized, for example, by a central processing unit (not shown) of the chat service 600 loading and executing programs stored in an auxiliary storage unit (not shown) into a main storage unit (not shown).

The file cooperation unit 601 provides a file-sharing function and the like indirectly connected to the cloud storage service 400. The shared documents attached to the chat message are transmitted from the chat service 600 to the cloud storage service 400 via the file cooperation unit 601. The file cooperation unit 601 also functions as a connection unit for referring to files uploaded to the cloud storage service 400 from the chat service 600.

The chat information management unit 602 stores text sentences shared between users, bitmap screens, and information on attached documents in the threaded format. The chat information management unit 602 organizes conversation information to store in a lower of the tree structure according to conversation progresses as communication information.

The plugin service 700 is connected to a plurality of cloud services and communicates with the cloud services, converts data, and transmits data to the cloud services. In the present embodiment, the plugin service 700 includes a data conversion unit 701, a service cooperation unit 702, and a data transmission unit 703. These software configurations are realized by the central processing unit 3001 of the plugin service 700 loading and executing programs stored in the auxiliary storage unit 3004 into the main storage unit.

If an export instruction is issued from the client computer 100, the data conversion unit 701 processes for extracting target communication information and for converting data. The communication information includes text sentences of the conversation, captured images, simple reaction reply information, and the like, in addition to various documents such as Microsoft Office® and PDF format shared on the services.

The service cooperation unit 702 is connected to the collaboration tool 300, the cloud storage service 400, the cloud print service 500, and the chat service 600 to execute various cooperation services. The data transmission unit 703 performs data communications with the collaboration tool 300, the cloud storage service 400, the cloud print service 500, and the chat service 600, and transmits and receives data to realize various cooperation functions.

In the present embodiment, each of the plurality of cloud services is connected to the plugin service 700 and cooperated to realize services by using the collaboration tool 300 as a key part. It is assumed that the information communicated during the cooperation between the services is shared in JSON format as shown in FIGS. 6A to 6C below by using GET, POST, PUT commands, and the like of the HTTP method. However, the information is not limited to the JSON format and may be organized in an XML format and implemented by SOAP communications, or any other format.

<The Chat UI Screen of the Collaboration Tool>

FIGS. 4A and 4B illustrate an example showing the chat UI screen of the collaboration tool 300 in the present embodiment. In the present embodiment, in order to configure chat communication components, the progress of the conversation is organized in the threaded format as a tree structure. Hereafter, FIGS. 4A and 4B are collectively referred to as "FIG. 4".

In FIG. 4, a parent post U101 is arranged at the top of the thread. The parent post U101 includes a text sentence "this is a document for the meeting" with a captured image U102 and an attachment U103 as an attached file "AAA.pptx". Further, the parent post U101 includes a reply icon U104 displayed as information about a simple reaction reply to the parent post U101. For the parent post U101, a reply post U105 is connected as a reference thread.

The reply post U105 includes a text sentence "thank you" and a reply icon U106 as information about a simple reaction reply to the reply post U105. The reply icon U106 shows annotation information indicating "Nice reaction by User A". The annotation information appears during the users hovering over the reply icon U106, so the users know who gives the simple reaction.

Furthermore, for the reply post U105, a reply post U107 is connected as a reference thread. The reply post U107 includes a text sentence "this is another document for the meeting" and an attachment U108 as an attached file "BBB.xlsx".

As shown in FIG. 4A, the UI of the collaboration tool 300 includes a three-point reader menu U109. Note that the three-point reader menu U109 holds identification information of other posts referring to the post including the three-point reader menu U109 as IDs of a team, a channel, and a message. The identification information is referred to when executing an HTTP method of an extraction process described in FIGS. 6A to 6D below. Details of the IDs of the team, the channel, and the message are described in FIGS. 6A to 6D below.

If the three-point reader menu U109 is selected, a detail menu U200 is displayed. The detail menu U200 includes functions such as "delete" to delete a post and "mark as unread" to assign an unread attribute to the post. Further, the detail menu U200 includes an export menu U201 that realizes the external output function in the present embodiment.

If the export menu U201 is selected in the detail menu U200, a menu U300 is displayed. The menu U300 includes functions such as "download" to download extracted data to the file storage of the client computer 100 as an external output destination, and "print" to print by the printer on the cloud print service 500.

Further, when "download" or "print" is selected in the menu U300, a menu U400 is displayed. The menu U400 includes functions such as "body text only" and "body text and attachments". The function of "body text only" is used to extract text sentences, simple reaction reply information, and bitmap images (not shown) as an export target, and the function of "body text and attachments" is used to further extract attached files. The menu U400 may be displayed as the menu configuration as shown in FIG. 4, but as another example, the menu U400 may include a checkbox on the export setting screen as shown by "attachment" checkboxes U502 and U602 shown in FIGS. 5A and 5B.

In FIG. 4A, the user operates exporting (downloading and printing) via the three-point reader menu U109 corresponding to the parent post U101 at the top of the thread. In this case, communication information included in all posts referring to the parent post U101 is extracted as an export target.

On the other hand, the example shown in FIG. 4B illustrates a case where the user operates exporting via a three-point reader menu U110 corresponding to the reply post U105 arranged in the middle of the thread. The three-point reader menu U110, like the U109, holds the identification information of other posts referring to the post including the three-point reader menu U110 as IDs of a team, a channel, and a message. The user can give an instruction to export contents of the post associated with the identification information. In this case, the export target includes only the reply post U105 and the reply post U107 as a reference thread of the reply post U105. Therefore, the text information, the attachment U108 as an attached file "BBB.xlsx", and the simple reaction reply information U106 included in the reply posts U105 and U107 are extracted. That is, in this case, the text information included in the post U101, the attachment U103 as an attached file "AAA.pptx", and the simple reaction reply information U104 are not extracted.

As described above, in the present embodiment, the progress of the conversation is organized in the threaded format as a tree structure in order to configure chat communication components. In a case where communications are organized in the tree structure, subsequent posts often conclude the conversation. If the user wants to extract only the conclusions, it may be preferable that only the subsequent posts are subject to extraction. Therefore, when exporting the communication information on the collaboration tool externally, in a case where the post to be extracted is arranged in the middle of the tree structure, only the contents posted after the post for which the user instructs the exporting are extracted. The contents posted before the post for which the user instructs the exporting are not extracted.

<The UI Screen for the Export Setting of the Collaboration Tool>

Figure 5A:
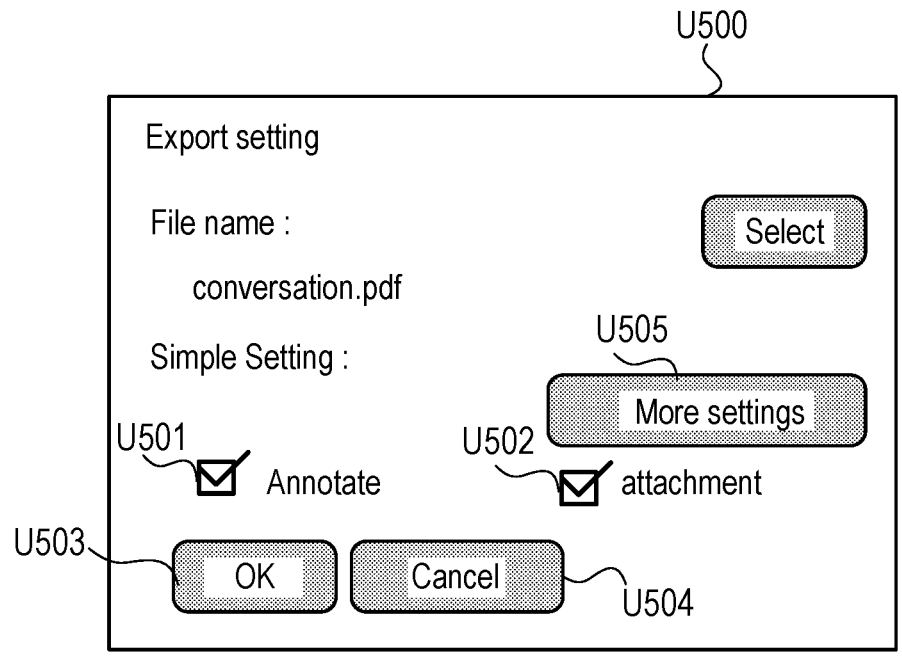
FIG. 5A illustrates the export setting UI screen of the collaboration tool.
Figure 5B:
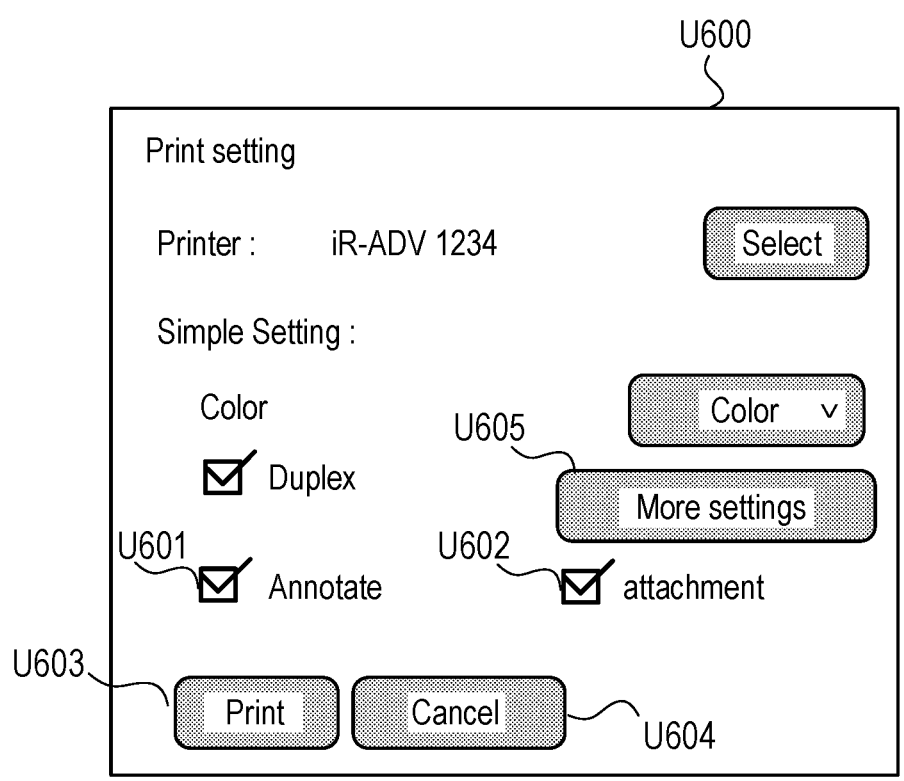
FIG. 5B illustrates the export setting UI screen of the collaboration tool.

FIGS. 5A to 5D illustrate an example of the UI screen for the export settings of the collaboration tool 300 in the present embodiment. Hereafter, FIGS. 5A to 5D are collectively referred to as "FIG. 5". If the function of "download" is selected in the menu U300 of FIG. 4, the screen shown in FIG. 5A is displayed. On the other hand, if the function of "print" is selected in the menu U300, the screen shown in FIG. 5B is displayed.

FIG. 5A illustrates an export setting screen U500. The export setting screen U500 includes an "Annotate" checkbox U501 and an "attachment" checkbox U502 in addition to basic information setting items such as a file name. Further, the export settings screen U500 also includes an "OK" button U503, a "Cancel" button U504, and a "More settings" button U505. Note that the checkbox U502 has been checked if the user selects the function of "body text and attachments" in the menu U400 of FIG. 4A or FIG. 4B. On the other hand, if "body text only" is selected in menu U400, the checkbox U502 has not been checked. Regardless of the selection in the menu U400, the user can change whether or not to export the attached file in the export setting screen U500. In the present embodiment, the menu U400 is used to set whether to export the attached file in advance.

The export setting screen U500 may be displayed instead of the menu U400 according to the selection of "download" in the menu U300.

FIG. 5B illustrates a print setting screen U600. The print setting screen U 600 is provided with an "Annotate" checkbox U601 and an "attachment" checkbox U602 in addition to device information of the printer 200 to be used for the printing operation and various basic print setting items. Further, the print setting screen U600 also includes a "Print" button U603, a "Cancel" button U604, and a "More settings" button U605.

The "Annotate" checkboxes U501 and U601 are checkboxes used for selecting whether or not the simple reaction reply information is included in as export data. If the checkbox is checked, the simple reaction reply information (for example, corresponding to the information U104 or U106) is extracted as an annotation attribute object. On the other hand, if the checkbox is not checked, the simple reaction reply information is masked and is not exported.

The "attachment" checkboxes U502 and U602 are checkboxes used for selecting whether or not the attached files are included in the exported data. If the checkbox is checked, the attached files (for example, corresponding to the file "AAA.pptx" as the attachment U103 or the file "BBB.xlsx" as the attachment U108) are included in the export data. If the checkbox is not checked, the attached files are masked and not exported. Note that the checkboxes U502 and U602 denote the same menu as that denoted by the menu U400 shown in FIG. 4 ("body text only"/"body text and attachments"). The configuration of the UI may be implemented in either the configuration of FIG. 4 or the configuration of FIG. 5. The preferred configuration can be selected according to the system configuration or user interface policy.

If the "Cancel" buttons U504 and U604 are pressed, the user can return to the screen shown in FIG. 4 without issuing the export instruction. If the "More settings" buttons U505 and U605 are pressed, a setting screen for selecting contents for export in more detail is displayed. The detail is described later in FIGS. 5C and 5D.

In FIG. 5A, if the "OK" button U503 is pressed, the collaboration tool 300 extracts the target communication information to convert the extracted information into the PDF format, for example. The converted information is downloaded in the file storage of the client computer 100. In FIG. 5B, if the "Print" button U603 is pressed, the collaboration tool 300 extracts the target communication information to transmit to the printer 200 connected to the cloud print service 500, and print processing is executed.

Figure 5C:
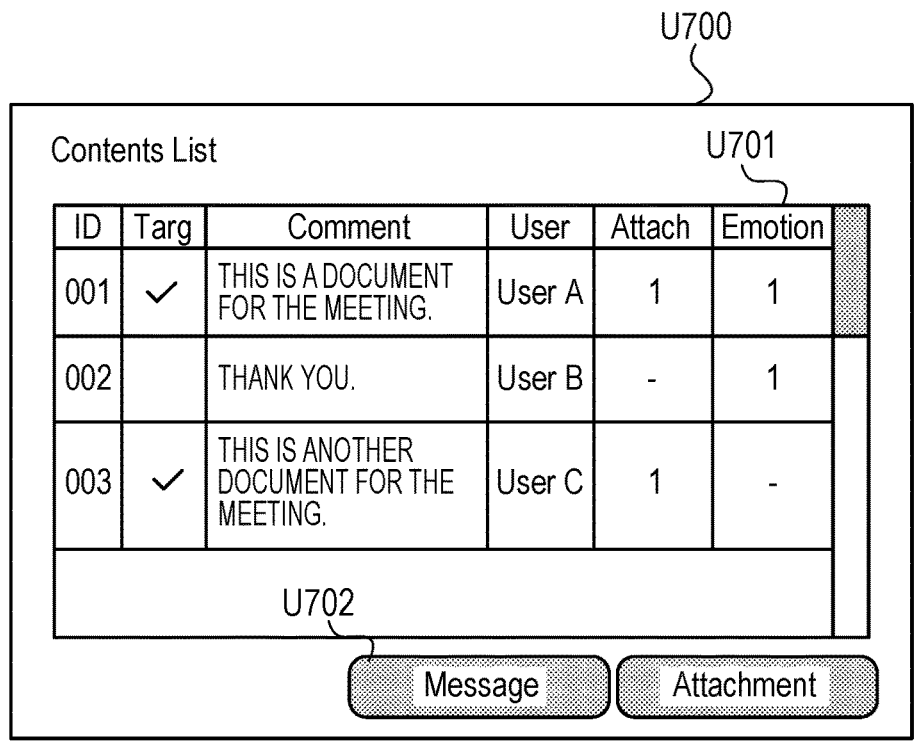
FIG. 5C illustrates the export setting UI screen of the collaboration tool.
Figure 5D:
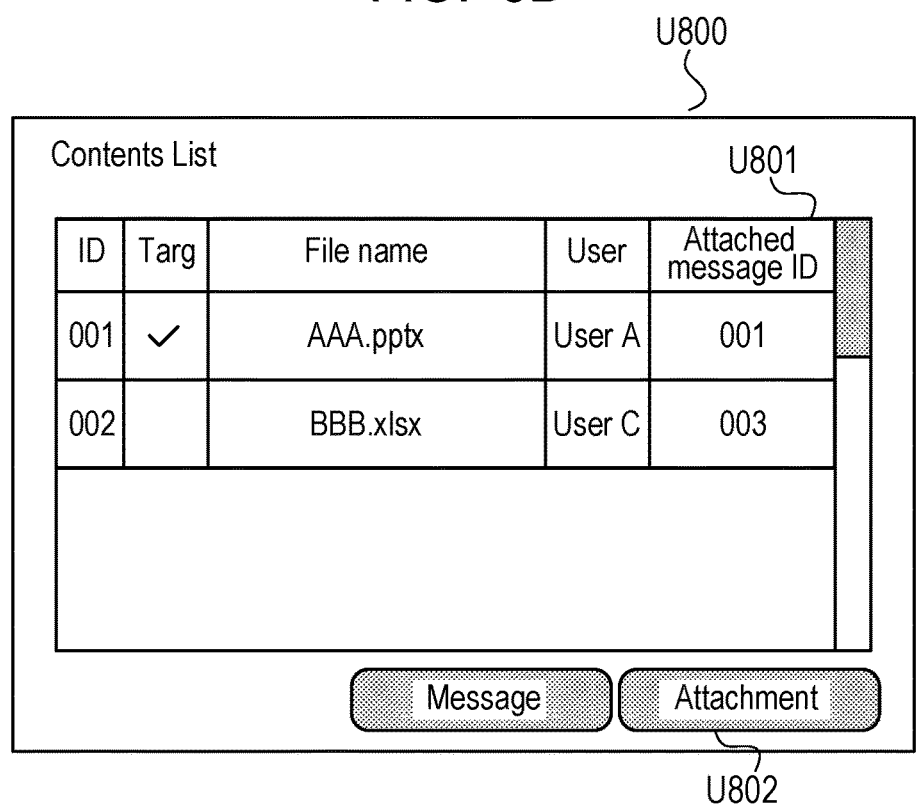
FIG. 5D illustrates the export setting UI screen of the collaboration tool.

FIG. 5C and FIG. 5D illustrate screens for detailed settings of posts to be extracted if the "More settings" buttons U505 and U605 are pressed. FIG. 5C illustrates a contents list U700 for the body of the content of the post, such as text sentences, bitmap images, and simple reaction reply information. FIG. 5D illustrates a list U800 of files attached to the thread.

Contents U701 within the contents list U700 shown in FIG. 5C include items such as an "ID" identifying the post, a "Comment" indicating the posted content, a "User" indicating the contributor, an "Attach" indicating the number of attachments, and an "Emotion" indicating the number of simple reaction information. In addition, the contents list U700 further includes a "Targ" (target) field and the user can select each post to be exported by checking each field. The user can select individual posts that are not referred to as a thread tree.

Contents U801 within the contents list U800 shown in FIG. 5D include an "ID" for identifying the file, a "File name" for indicating the file name, a "User" for indicating the contributor, and an "Attached message ID" for the attached post as information about attached files. Similar to the contents U701, the contents U801 further include a "Targ" (target) field and the user can select each file to be exported by checking each field. The user can select individual attachments to be extracted.

The contents lists U700 and U800 shown in FIGS. 5C and 5D further include a "Message" button U702 and an "Attachment" button U802. The screen can be switched to a screen displaying the contents lists U700 or U800 by pressing either of the buttons U702 and U802. If the "Message" button U702 is pressed, the screen shown in FIG. 5C is displayed (transition of screens). If the "Attachment" button U802 is pressed, the screen shown in FIG. 5D is displayed (transition of screens).

<The Data Structure of the JSON Data Provided by the Chat Service>

FIGS. 6A to 6D illustrate a communication data structure in a JSON format adopted as an example of information shared between the cloud cooperation services in the present embodiment. Hereafter, FIGS. 6A to 6D are collectively referred to as "FIG. 6".

FIG. 6A illustrates a JSON format data response from the chat service 600 if an HTTP GET method is executed from the plugin service 700 to the chat service 600 to obtain the contents posted to the parent thread U101. That is, FIG. 6A illustrates the data structure of the JSON format representing the contents of the parent post U101 in FIG. 4.

In response to executing the GET method, the plugin service 700 issues the GET method with the IDs of the team, the channel, and the message as the identifiers of the posted contents in the description of the three-point reader menus U109 and U110 shown in FIG. 4. For example, the plugin service 700 issues an HTTP request with a specification such as "GET https://xxxxxx/{TeamID}/{ChannelID}/{MessageID}/" to the chat service 600. A method of specifying the GET method follows an API specification of the services.

In the present embodiment, the "TeamID" means an identifier of a chat container that can be connected to the chat service managed by the chat service 600. A plurality of users participates in the chat container, and the chat service manages the identifier of the chat container in association with the identifiers of the users. The "ChannelID" denotes the identifier of the chat channel as segmented by the user within that chat container. The "MessageID" is an identifier that uniquely identifies a chat message shared within that chat channel. These examples are based on the configuration of identifiers on the Teams chat service in GraphAPI, which is provided by Microsoft® as an external publication specification. However, the present disclosure is not limited to the above configuration. If the contents of the target post can be uniquely identified as a chat service, there is no "TeamID" or "ChannelID", and only the "MessageID" may be designated as an identifier.

FIG. 6B illustrates the JSON format data returned from the chat service 600 if the HTTP GET method is executed by the plugin service 700 for the chat service 600 to obtain the contents posted to the reference thread U105 of the parent thread U101. That is, FIG. 6B illustrates the data structure of the JSON format representing the contents of the post U105 shown in FIG. 4.

FIG. 6C also illustrates JSON format data returned from the chat service 600 if the HTTP GET method is executed by the plugin service 700 for the chat service 600 to obtain the contents posted to the reference thread U107 of the reference thread U105. That is, FIG. 6C illustrates the data structure of the JSON format representing the content of the reference thread U107 shown in FIG. 4.

If obtaining this information, the plugin service 700 issues the HTTP GET method as "GET https://xxxxxx/{TeamID}/{ChannelID}/{(parent) MessageID}/replies" to the chat service 600, for example. By specifying the "{(parent) MessageID}", the contents of the reply post referring to the (parent) post identified by the "MessageID" are obtained. The "MessageID" is identifying information that identifies each message posted to the chat service.

For example, by specifying the "MessageID" T101 of the post U101 shown in FIG. 6A for the "{(parent) MessageID}" in the GET method and issuing the GET method, the contents of the post U105 shown in FIG. 6B are obtained. Further, by specifying the obtained "MessageID" T201 of the post U105 for "{(parent) MessageID}" in the GET method and issuing the GET method, the contents of the post U107 which is a reply to the post U105 shown in FIG. 6C are obtained. In this way, all the content of the posts referring to a given thread can be obtained by repeatedly obtaining the "MessageID" corresponding to the post based on the content of the post in the JSON format and issuing the GET method with the "{(parent) MessageID}".

Furthermore, as descripted in the three-point reader menus U109 and U110 shown in FIG. 4, the "MessageID" for the target post is held inside the three-point reader menu. Therefore, all the content from a given post to the end of the tree structure of the posts referring to the given post can be obtained by repeatedly reading the "MessageID" held in the three-point reader menu of the post in the middle of the thread, specifying the "MessageID" for the "{(parent) MessageID}", and issuing the GET method.

Note that the way these GET methods are specified depends on the API specification. As described above, not only a method of specifying "replies" to obtain all the posts one by one, but also a method of specifying "messageAll" may be prepared. All posts of reference threads referring to the "{(parent) MessageID}" can be obtained at once by specifying "GET https://xxxxxx/{TeamID}/{ChannelID}/{(parent) MessageID}/messageAll" as a GET method, for example. In this case, all the posts included in one piece of the JSON format data, as shown in FIG. 6D, can be collectively obtained.

FIG. 6D illustrates the information returned from the chat service 600 if the GET method of HTTP is executed by the plugin service 700 for the chat service 600 to obtain all the postings of the reference threads referring to the specified thread at once. That is, FIG. 6D illustrates a data structure in the JSON format representing the content of the post including the posts U101, U105, and U107 shown in FIG. 4.

The correspondence between the contents of posts represented in the JSON format will be described in more detail below using FIG. 6A. The JSON format data showing the content of the post includes an identifier identifying the post as a "MessageID" T101. The information of the "MessageID" T101 is described as information in the "messageId" attribute.

The content of the post including text sentences, pasted bitmap images, and other body information is described as a "body" attribute T102 and represented in HTML tag format. Further, an attachment file is described as an "attachment" attribute T103, and an ID to uniquely identify the attachment, a URL indicating the storage area where the file entity is stored, a file name, and the like are included in the "attachment" attribute T103 as information. Furthermore, the simple reaction reply information is described as a "reactions" attribute T104, and the reaction content, the date and time of reply, the responder information, and the like are described in the "reactions" attribute T104.

The plugin service 700 in the present embodiment shares these JSON formatted communication information between cloud services, refers to predetermined attribute information and extracts the contents of the post.

<Example of the PDF Description of an Annotation Attribute Object>

FIG. 7 illustrates a diagram showing an example of conversion descriptions if the plugin service 700 converts the simple reaction reply information included therein into an annotation attribute object in the process of converting export information into the PDF format (shown in FIG. 12 below).

As described above, the simple reaction reply information is often used as an understatement because it is only used as additional information on the collaboration tool 300. Communication information need not always be represented. It is desirable that, in the representation of PDF data, the communication information is represented as an annotation object that can be changed whether it is displayed or not in the preview/print settings.

Therefore, in the present embodiment, for example, the simple reaction reply information U106 shown in FIG. 4 is converted into the annotation object by attaching text information such as "Nice reaction by UserA" as shown in FIG. 7 and describing the text information in the PDF format with the "/Annot" attribute attached. Although this is given as a relatively simple example of description, the annotation objects in PDF format may be represented not only by the text annotations but also by stamp annotations or pop-up annotations. The representation method is not limited to the example shown in FIG. 7.

Note that the processing of the annotation attribute object description of the simple reaction reply information described here (step S2105 in FIG. 12, described later) may be performed by processing to convert the text information into the PDF format on the cloud print service 500 side (step S4005 in FIG. 14, described later).

<The Sequence for Exporting Contents Information>

Next, an example of a processing sequence of issuing the export request from the client computer 100, downloading the data from the collaboration tool 300, and storing the downloaded data in the local storage area is described with reference to FIG. 8. Note that the processing sequence for selecting "download" on the menu U300 shown in FIG. 4A and using the export setting screen U500 and the checkbox U502 in FIG. 5A rather than the menu U400 will be described.

Figure 8:
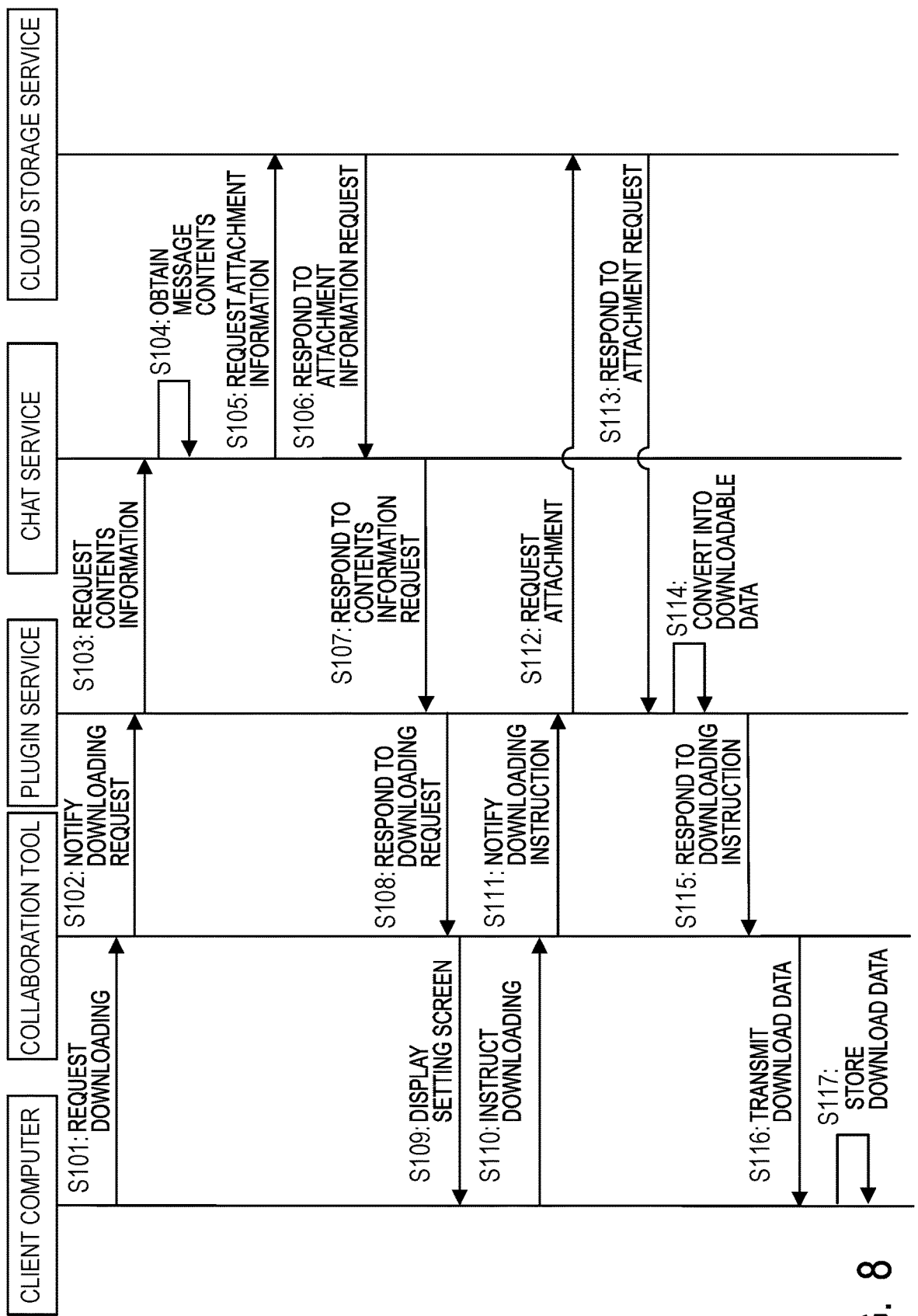
FIG. 8 illustrates a sequence diagram for downloading content information.

FIG. 8 illustrates a diagram showing the sequence in downloading the contents information. The sequence is started if the user traces the content of the post to be exported from the three-point reader menu on the chat UI screen of the collaboration tool 300 as shown in FIG. 4A from the client computer 100 and selects "download" on the menu U300.

First, the client computer 100 sends a request to the collaboration tool 300 for downloading the posted content after the post corresponding to the three-point reader menu with "download" selected (step S101: request downloading). In response to the download request in step S101, the collaboration tool 300 notifies the plugin service 700 of the download request from the client computer 100 (step S102: notify download request). The collaboration tool 300 notifies the plugin service 700 of the "TeamID", "ChannelID", and "MessageID" corresponding to the three-point reader menu selected by the user.

In response to the notification in step S102, the plugin service 700 transmits a request for exporting the contents of the post requested from the client computer 100 and for exporting the contents of the post referring to the post to the chat service 600 (step S103: request contents information). In this case, the GET method of HTTP described in FIG. 6 is used to request the content of the post.

In response to the request in step S103, the chat service 600 refers to the chat information managed in the chat information management unit 602 of the chat service 600, and extracts the content of the post corresponding to the requested post (step S104: obtain message contents).

Next, the chat service 600 send a request to the cloud storage service 400 for the information of the document attached to the above requested post (step S105: request attachment information).

In response to the request in step S105, the cloud storage service 400 responds with the information of the requested document to the chat service 600 (step S106: respond to attachment information request). Here, it is considered that URL information indicating where in the file storage unit 402 of the cloud storage service 400 the document is stored is shared.

In response to the response in step S106, the chat service 600 responds to the plugin service 700 with the contents of the post extracted in step S104 in the JSON format shown in FIG. 6 as contents information together with the information of the document obtained in step S106 (step S107: respond to contents information request). In response to the response in step S107, the plugin service 700 responds to the collaboration tool 300 with the content information obtained in step S107 (step S108: respond to downloading request). In response to the response in step S108, the collaboration tool 300 presents the export setting screen as shown in FIG. 5A to the client computer 100 (step S109: display setting screen).

On the export setting screen as shown in FIG. 5A in step S109, after the user has performed various download settings (in this case, it is assumed that the user checks the checkbox U502), the user presses the "OK" button U503. In response to the pressing operation, the client computer 100 issues download instructions to the collaboration tool 300 (step S110: instruct downloading).

In response to the instruction in step S110, the collaboration tool 300 notifies the plugin service 700 that the download instructions have been issued from the client computer 100 (step S111: notify downloading instruction). In response to the notification in step S111, the plugin service 700 sends a request to the cloud storage service 400 for the entity of the attachment file to be downloaded by the notified download instruction (step S112: request attachment).

In response to the request in step S112, the cloud storage service 400 transmits the entity of the requested attachment (document) to the plugin service 700 (step S113: respond to attachment request).

In response to the reception of the document transmitted in step S113, the plugin service 700 converts the received document with the data of the posted content to be downloaded by the download instruction into data in a downloadable format (step S114: convert to downloadable data). In the present embodiment, the downloadable format is assumed to be the PDF format, but the downloadable format may be a format where JSON format, bitmap images, and documents are compressed in zip-file format as a single piece of data. The downloadable format is not limited to the PDF format.

Next, the plugin service 700 responds to the collaboration tool 300 with the downloaded data (the document and the data of posted content) converted in step S114 (S115: respond to downloading instruction). In response to the response in step S115, the collaboration tool 300 transmits the downloaded data included in the response to the client computer 100 (step S116: transmit download data).

Upon receiving the downloaded data transmitted in step S116, the client computer 100 stores the received downloaded data in the local storage area allocated to the auxiliary storage unit of the client computer 100 (step S117: store download data).

According to the above sequence, the processing is performed by the client computer 100 issuing the export request, downloading the data from the collaboration tool 300 and the plugin service 700, and storing the downloaded data in the local storage area.

<The Sequence for Printing Contents Information>

Figure 9:
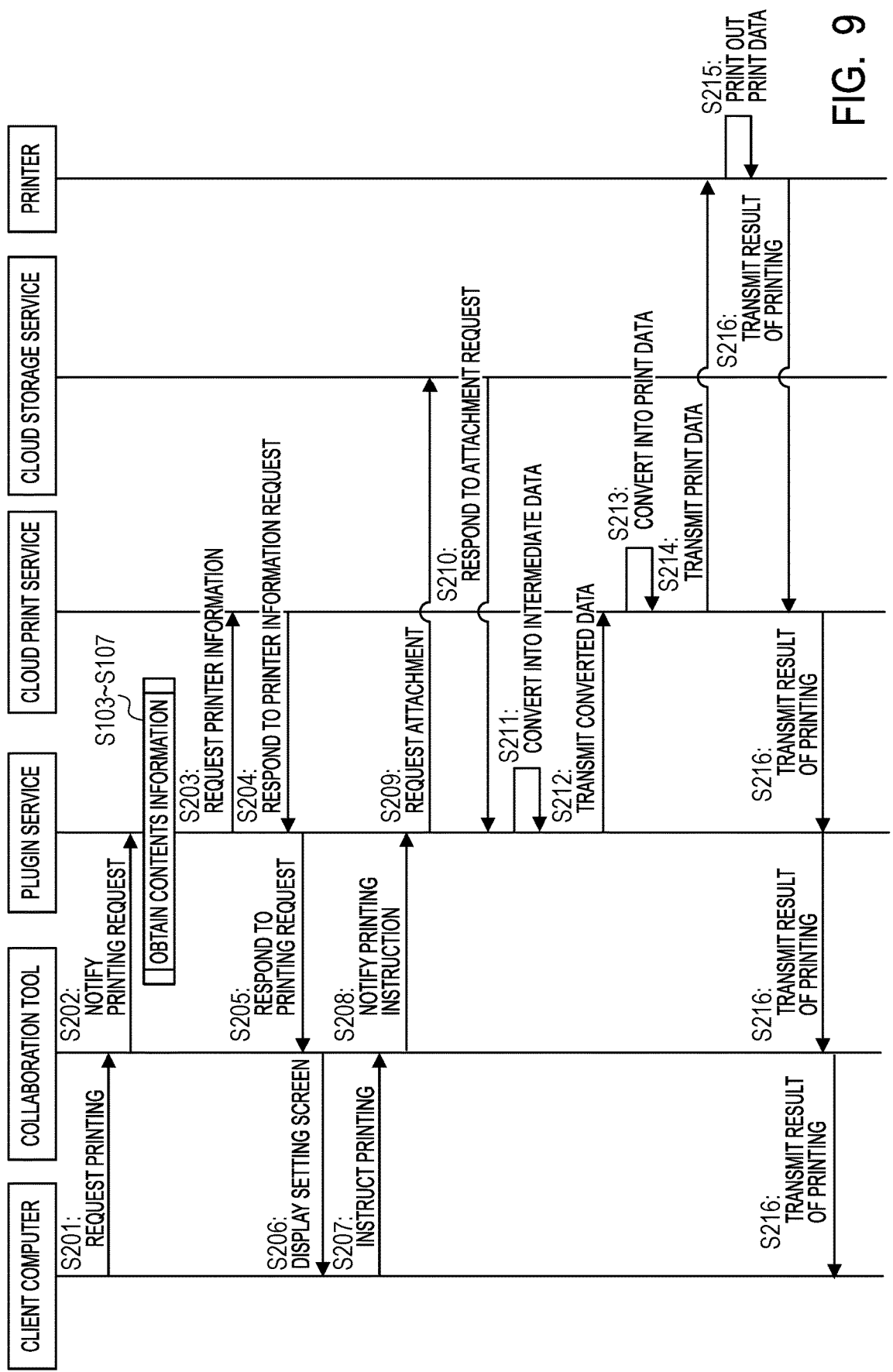
FIG. 9 illustrates a sequence diagram for printing content information.

Next, an example of a processing sequence of issuing the export request from the client computer 100, transmitting data from the plugin service 700 to the cloud print service 500, and printing the data from the printer 200 with reference to FIG. 9. Note that the processing sequence for selecting "print" on the menu U300 shown in FIG. 4B and using the print setting screen U600 and the checkbox U602 shown in FIG. 5B rather than the menu U400 will be described.

FIG. 9 illustrates a diagram showing the sequence in printing the contents information. The sequence is started if the user traces the content of the post to be exported from the three-point reader menu on the chat UI screen of the collaboration tool 300 as shown in FIG. 4B from the client computer 100 and selects "print" on the menu U300.

First, the client computer 100 requests printing to the collaboration tool 300 for contents posted after the post corresponding to the three-point reader menu with "print" selected (step S201: request printing). In response to the print request in step S201, the collaboration tool 300 notifies the plugin service 700 of the print request from the client computer 100 (step S202: notify printing request). The collaboration tool 300 notifies the plugin service 700 of the "TeamID", "ChannelID", and "MessageID" corresponding to the three-point reader menu selected by the user. The plugin service 700 obtains the contents information by using the "TeamID", "ChannelID", and "MessageID" notified from the collaboration tool 300.

In response to the notification in step S202, the plugin service 700, the chat service 600, and the cloud storage service 400 perform the sequences (obtaining the contents information) corresponding to steps S103 to S107 in FIG. 8. Details of the steps are same as those in FIG. 8 and the description of the steps is omitted.

In response to obtaining the contents information by the sequences corresponding to steps S103 to S107 in FIG. 8, the plugin service 700 requests printer information indicating selectable printers to the cloud print service 500 (step S203: request printer information). If the plugin service 700 does not have an access token to obtain printer information from the cloud print service 500, the cloud print service 500 displays a screen for login in the collaboration tool 300, receives a user ID and a password input from the user, and authenticates the user. If the plugin service 700 has the access token, the foregoing authentication is not performed and the processing of step S204 is performed.

In response to the request step S203, the cloud print service 500 responds to the plugin service 700 with information about a list of printers connected with the cloud print service 500 and capable of transmitting the print job (step S204: respond to printer information request).

In response to the response in step S204, the plugin service 700 responds to the collaboration tool 300 with the obtained content information along with the information of the printer (step S205: respond to printing request). In response to the response in step S205, the collaboration tool 300 presents the print setting screen as shown in FIG. 5B to the client computer 100 (step S206: display setting screen).

In step S206, the user presses the "Print" button U603 after the user has specified various print settings (in this case, it is assumed that the user checks the checkbox U602) on the print setting screen as shown in FIG. 5B. In response to the operation, the client computer 100 issues a print instruction to the collaboration tool 300 (step S207: instruct printing).

In response to the print instruction in step S207, the collaboration tool 300 notifies the plugin service 700 that the print instruction has been issued from the client computer 100 (step S208: notify printing instruction). In response to the notification in step S208, the plugin service 700 requests the entity of the attachment file to be printed by the notified print instruction to the cloud storage service 400 (step S209: request attachment).

In response to the request in step S209, the cloud storage service 400 transmits the entity of the requested attachment (document) to the plugin service 700 (step S210: respond to attachment request).

In response to the reception of the document transmitted in step S210, the plugin service 700 converts the received document with the data of the posted content to be printed by the print instruction into data in a transmittable format (step S211: convert to intermediate data). In the present embodiment, the transmittable format is assumed the PDF format, but the transmittable format may be a format compressing JSON format, bitmap images, and documents in zip-file format into a single piece of data. The transmittable format is not limited to the PDF format.

Next, the plugin service 700 transmits the print data converted in step S211 to the cloud print service 500 (step S212: transmit converted data). Upon receiving the print data transmitted in step S212, the cloud print service 500 converts the received print data into printable data (step S213: convert print data). The details of the processing will be described with reference to FIG. 14. Here, the print data is converted into the printable data with a format that the destination printer can print out.

Next, the cloud print service 500 transmits the printable data converted in step S213 to the printer 200 (step S214: transmit print data). The printer 200 receiving the printable data transmitted in step S214 prints the received printable data (step S215: print out print data).

Next, the printer 200 transmits the print processing result of the step S215 to the cloud print service 500 (step S216: transmit result of printing). The result response in step S216 is transmitted from the cloud print service 500 to the plugin service 700, further transmitted from the plugin service 700 to the collaboration tool 300, furthermore transmitted from the collaboration tool 300 to the client computer 100, and notified to the user.

According to the above processing sequence, the processing of issuing the export request from the client computer 100 to the collaboration tool 300, transmitting the print data from the plugin service 700 to the cloud print service 500, and printing the print data by the printer 200 is performed.

<The Flowchart of Generating a Screen for Extracting Contents Information Process>

Figure 10:
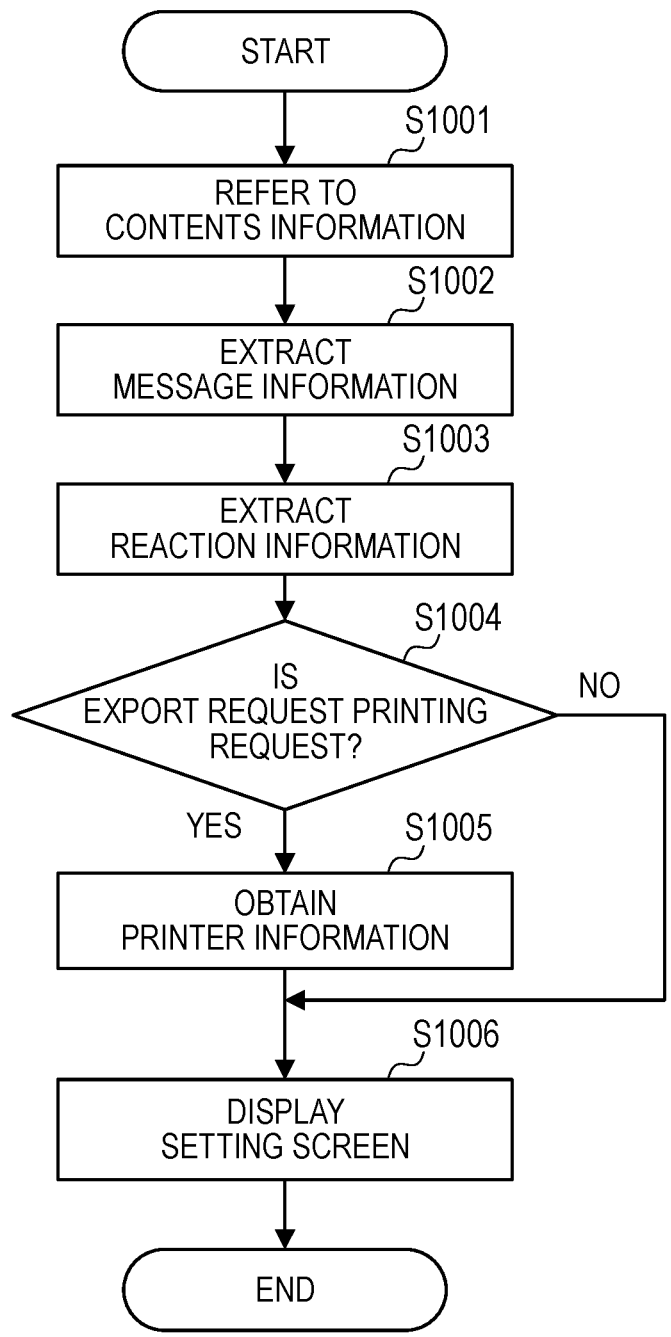
FIG. 10 illustrates a flowchart showing a screen generation processing for extracting content information.

FIG. 10 illustrates a flowchart showing an example of generating a screen for extracting contents information processing by the plugin service 700. In the present embodiment, the menu configuration including the menus U500 and U600 shown in FIG. 5 and the checkboxes U502 and U602 shown in FIG. 5 rather than the menu U400 in FIG. 4 will be described. The processing of the flowcharts shown in FIGS. 10, 11, and 12 is realized if the central processing unit 3001 of the plugin service 700 loads and executes programs stored in the auxiliary storage unit 3004 into the main storage unit 3002.

If the user selects "download" or "print" on the menu U300 in FIG. 4 via the client computer 100, the plugin service 700 is notified via the collaboration tool 300 that the plugin service 700 has been called. In response to the notification, the plugin service 700 starts processing of the flowchart. It is assumed that the notification includes the "TeamID", "ChannelID", and "MessageID" corresponding to the three-point reader menu used by the user when the user instructs exporting data.

First, in step S1001, the central processing unit 3001 of the plugin service 700 requests the contents information of the posted content that is the subject of export (downloading or printing) to the chat service 600, and refer to the obtained contents information. Specifically, the GET method described in FIG. 6 is issued to obtain the contents information in the JSON format from the chat service 600 and refer to the information required for extraction processing. At this time, the plugin service 700 obtains the contents information using the "TeamID", "ChannelID", and "MessageID" notified by the collaboration tool in step S102 of FIG. 8.

Next, in step S1002, the central processing unit 3001 of the plugin service 700 extracts text information corresponding to the body and a bitmap image as message information from the contents information in the JSON format obtained from the chat service 600. More specifically, the text information is extracted with reference to the "body" attribute T102 shown in FIG. 6A.

Next, in step S1003, the central processing unit 3001 of the plugin service 700 extracts the simple reaction reply information from the contents information in the JSON format. More specifically, the simple reaction reply information is extracted with reference to the "reactions" attribute T104 shown in FIG. 6A.

Then, in step S1004, the central processing unit 3001 of the plugin service 700 determines whether or not the export request from the client computer 100 is the print request. If the export request is the print request (Yes in step S1004), the central processing unit 3001 of the plugin service 700 advances the process to step S1005. On the other hand, if the export request is not the print request (No in step S1004), the central processing unit 3001 of the plugin service 700 advances the process to step S1006.

In step S1005, the central processing unit 3001 of the plugin service 700 requests information of the printer 200 connected to the cloud print service 500, and obtains the information of the printer 200 from the cloud print service 500. The processing in step S1005 corresponds to step S203 in FIG. 9. After processing in step S1005, the central processing unit 3001 of the plugin service 700 advances the process to in step S1006.

In step S1006, the central processing unit 3001 of the plugin service 700 displays the export setting screen shown in FIG. 5 via the collaboration tool 300. In detail, the central processing unit 3001 of the plugin service 700 controls to display the screen of FIG. 5A if the export request from the client computer 100 is the download request. On the other hand, the central processing unit 3001 of the plugin service 700 controls to display the screen of FIG. 5B if the export request is the print request. After the processing in step S1006, the central processing unit 3001 of the plugin service 700 terminates the processing of this flowchart.

As described above, if the user selects "download" or "print" in the menu U300 traced from the three-point reader menu in FIG. 4, the plugin service 700 presents the setting screen according to the user selection to the client computer 100 with the configuration of the example shown in FIG. 5. The setting screen includes the "Annotate" checkbox U501/U601 selecting whether to export the simple reaction reply information as an annotation attribute object or not and the "attachment" checkbox U502/U602 selecting whether to export attachments or not. In the screens shown in FIG. 5C and FIG. 5D, it is more convenient to not display the menu by graying out if the content of posts to be exported can be individually selected or if there is no simple reaction reply information and attachments. Therefore, if the client computer requests the export instruction, the plugin service 700 obtains and refers to the contents of the post in the JSON format by issuing the GET method described above, checks whether the simple reaction reply information and the attachments are included or not, and extracts the content of the post. Further, if the print instruction is requested, the plugin service 700 obtains information of the printers connected to the cloud print service 500 and presents a list of printers that can perform a printout process, and the user can select a printer from the client computer 100.

As described above, the processing of generating a screen for extracting contents information by the plugin service 700 is executed.

<The Flowchart of Processing for Transmitting Data of Contents Information>

Figure 11:
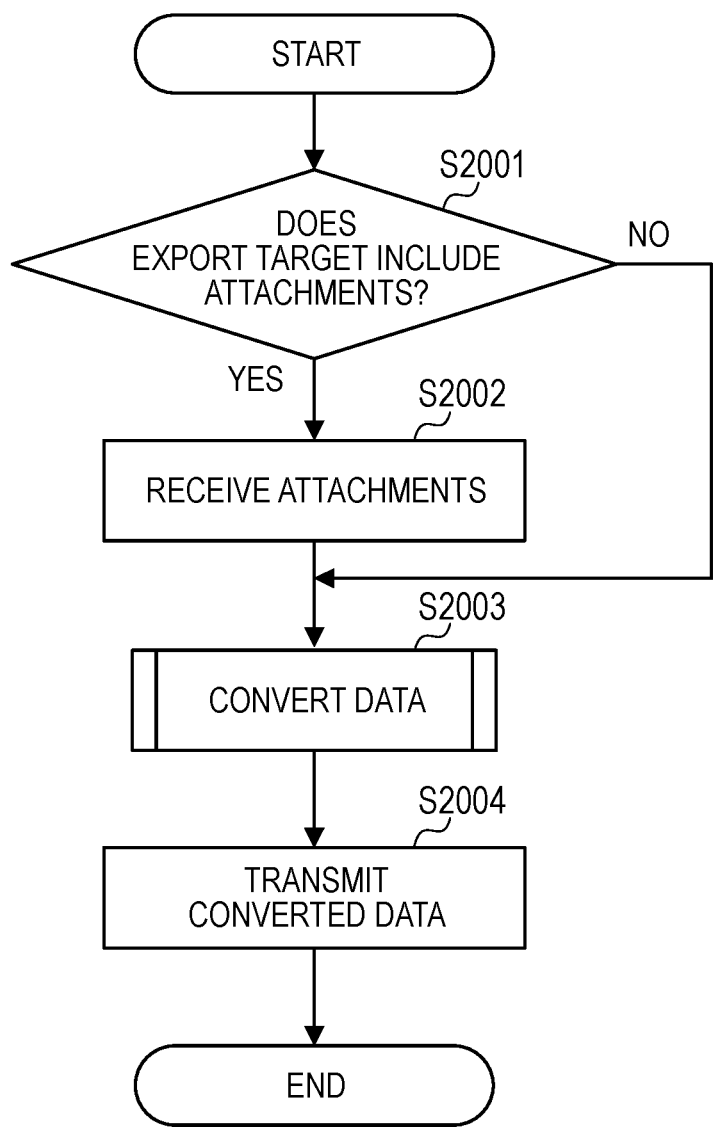
FIG. 11 illustrates a flowchart showing data transmission processing for content information.

FIG. 11 illustrates a flowchart showing an example of processing for transmitting data of contents information executed by the plugin service 700. If the user presses the "OK" button U503 or "Print" button U603 of FIG. 5 via the client computer 100, the plugin service 700 is notified via the collaboration tool 300 that the user has pressed the "OK" button U503 or "Print" button U603. In response to the notification, the plugin service 700 starts processing of the flowchart.

First, in step S2001, the central processing unit 3001 of the plugin service 700 determines whether attachments should be included in the export data. If the user instructs to include the attachments in the export data on the menu U400 or the user gives the instruction via the "attachment" checkboxes U502/U602 using the client computer 100 (Yes in step S2001), the central processing unit 3001 of the plugin service 700 advances the process to step S2002. On the other hand, if the user does not instruct to include the attachment in the export data (No in step S2001), the central processing unit 3001 of the plugin service 700 advances the process to step S2003.

In step S2002, the central processing unit 3001 of the plugin service 700 requests an entity of the attachment to the cloud storage service 400, and receives the entity from the cloud storage service 400, and advances the process to step S2003.

In step S2003, the central processing unit 3001 of the plugin service 700 performs data conversion processing of the posted content to be exported. The process will be described in detail later with reference to FIG. 12.

Then, in step S2004, the central processing unit 3001 of the plugin service 700 transmits the data converted in step S2003 to a predetermined transmission destination. If the export request from the client computer 100 indicates the downloading, the data is transmitted to the client computer 100. On the other hand, if the export request indicates the printing, the data is transmitted to the cloud print service 500. If the processing is completed, the central processing unit 3001 of the plugin service 700 terminates the processing of this flowchart.

As described above, if the user presses the "OK" button U503 or the "Print" button U603 shown in FIG. 5 via the client computer 100, the collaboration tool 300 notifies the plugin service 700 of the instruction of the export request. In response to the notification, the plugin service 700 converts the data of the posted contents to be exported and transmits the converted data to the client computer 100 or the cloud print service 500. If the plugin service 700 exports the data of the posted contents including the attachments, the plugin service 700 obtains the entity of the attachments from the cloud storage service 400 and transmits the data of the posted contents including the attachments together.

As described above, the processing for transmitting data of contents information is performed by the plugin service 700.

<The Flowchart of Contents Information Data Conversion Processing>

Figure 12:
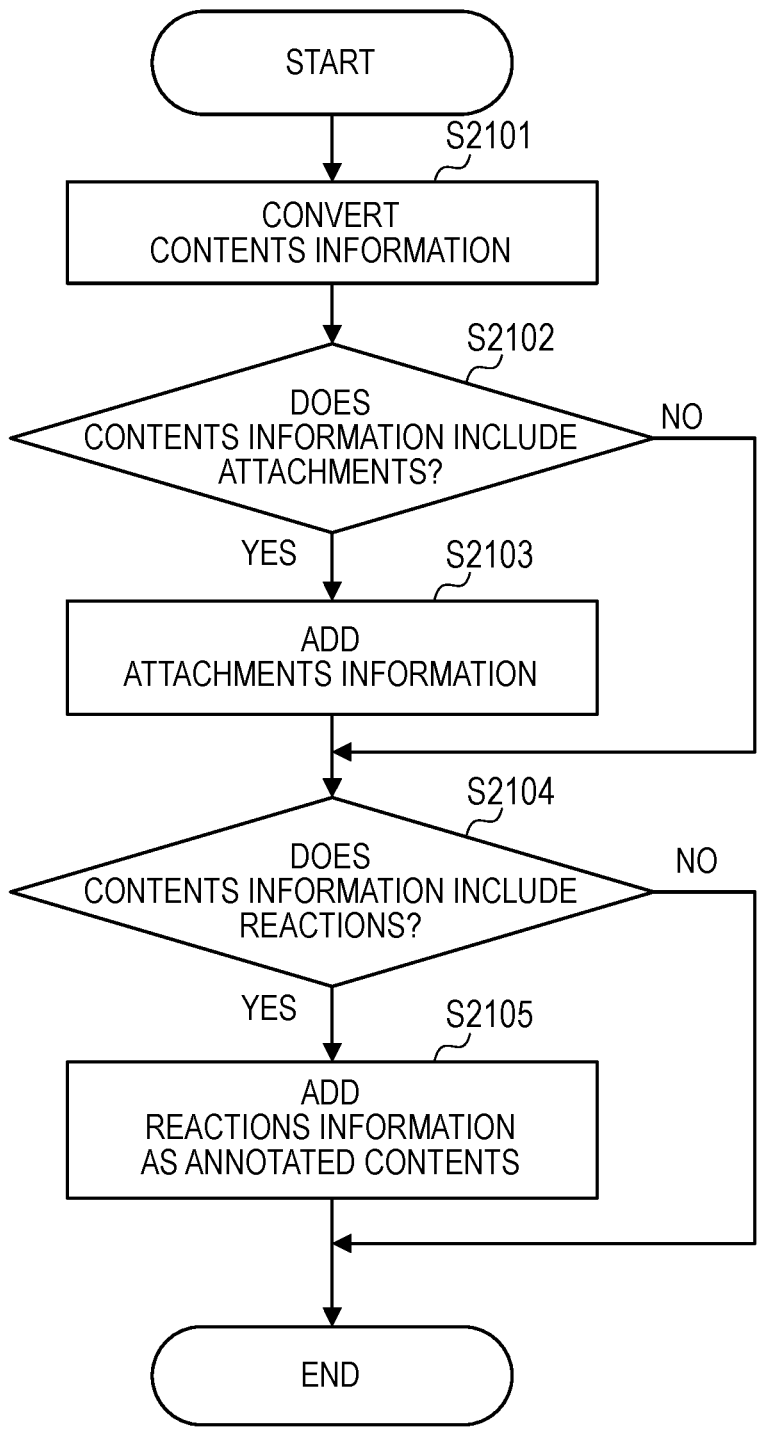
FIG. 12 illustrates a flowchart showing a data conversion processing for content information.

FIG. 12 illustrates a flowchart showing an example of the processing for converting data of contents information (corresponding to step S2003 in FIG. 11) executed by the plugin service 700. If the process proceeds to step S2003 in FIG. 11, the central processing unit 3001 of the plugin service 700 starts the processing of this flowchart.

First, in step S2101, the central processing unit 3001 of the plugin service 700 converts the text information and the bitmap images included in the body of the contents to be converted into text attribute objects and image attribute objects in the PDF description, respectively. That is, the content information to be converted is converted into PDF data. Here, the central processing unit 3001 of the plugin service 700 converts the post that is instructed to export by the user using the menu U300 and the posts lower than the post that is instructed to export by the user in the threaded format. If the user selects the post on the "Targ" field shown in FIG. 5C, the post to be converted is determined according to the user selection.

Then, in step S2102, the central processing unit 3001 of the plugin service 700 determines whether the contents of the post to be converted includes the attachments. If the attachments are included in the contents (Yes in step S2102), the central processing unit 3001 of the plugin service 700 advances the process to step S2103. On the other hand, if the attachments are not included in the contents (No in step S2102), the central processing unit 3001 of the plugin service 700 advances the process to step S2104.

In step S2103, the central processing unit 3001 of the plugin service 700 embeds the attachments into the PDF data converted in step S2101. It should be noted that the central processing unit 3001 of the plugin service 700 embeds the information of the attachments in the PDF file according to a layout of the posted contents so that the user can recognize the file names of the attachments. If the user selects the attachments in the "Targ" field of FIG. 5C and FIG. 5D, the central processing unit 3001 of the plugin service 700 selects the attachments to be embedded according to the user selection. If the processing in step S2103 is completed, the central processing unit 3001 of the plugin service 700 advances the process to step S2104.

In step S2104, the central processing unit 3001 of the plugin service 700 determines whether or not the simple reaction reply information is included in the posted contents to be converted. If the simple reaction reply information is included in the posted contents (Yes in step S2104), the central processing unit 3001 of the plugin service 700 advances the process to step S2105. On the other hand, if the simple reaction reply information is not included in the posted contents (No in step S2104), the central processing unit 3001 of the plugin service 700 terminates the processing of this flowchart.

In step S2105, the central processing unit 3001 of the plugin service 700 converts the simple reaction reply information into the annotation attribute object in the PDF description. That is, the annotation attribute object corresponding to the simple reaction reply information is added to the generated PDF data. After the processing in step S2105, the central processing unit 3001 of the plugin service 700 terminates the processing of this flowchart.

As described above, the plugin service 700 converts the posted contents to be exported into a data-transmittable format to perform data transmission. In the data conversion processing, the central processing unit 3001 of the plugin service 700 converts the text information, the bitmap images, and the simple reaction reply information of the posted content to be exported together with the attachments as communication information, respectively. As an example of the data format adopted for conversion, the PDF format is used in the present embodiment. The text information is converted into text attribute objects, the bitmap images are converted into image attribute objects, and the simple reaction information is converted into annotation attribute objects as described in FIG. 7. The attachments are directly embedded in the PDF data, and converted into the PDF data.

It should be noted that in the present embodiment, while the PDF format is used as an example of a data format for data conversion, any data format that can hold equivalent information, such as XPS format, may be used and the present embodiment is not limited to the usage of the PDF format as a data format.

As described above, the processing for converting data of the contents information is executed by the plugin service 700.

<The Flowchart of Processing for Extracting Contents Information>

Figure 13:
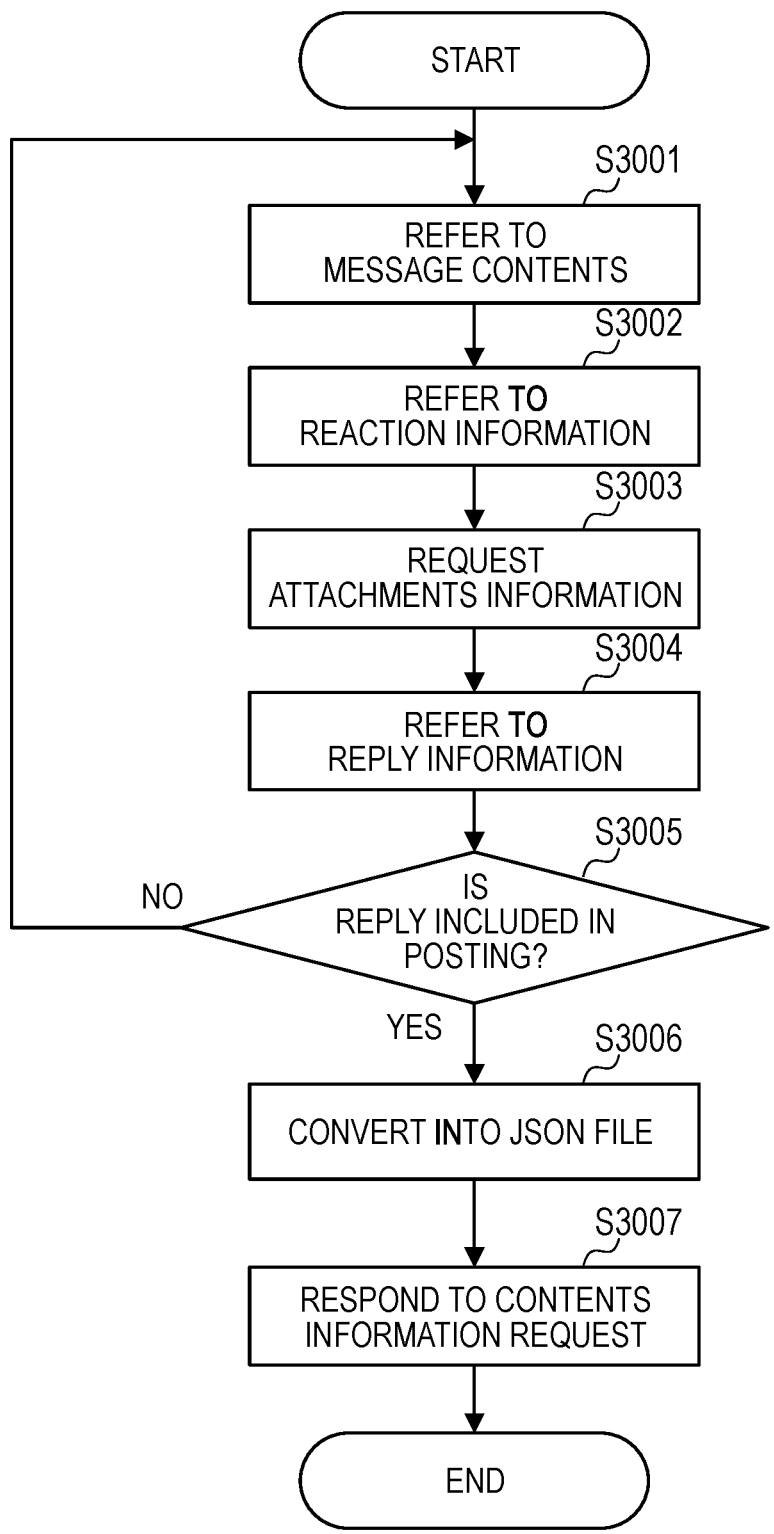
FIG. 13 illustrates a flowchart showing an extraction processing for content information.

FIG. 13 illustrates a flowchart showing an example of processing for extracting contents information executed by the chat service 600. The processing of the flowchart is realized by a central processing unit (not shown) of the chat service 600 loading and executing a program stored in an auxiliary storage unit (not shown) into a main storage unit (not shown).

In step S103 of FIG. 8, if the chat service 600 receives the request to obtain the posted contents from the plugin service 700, the central processing unit of the chat service 600 starts the processing of the flowchart. First, in step S3001, the central processing unit of the chat service 600 refers to the text sentences and the bitmap images included in the posted contents to be extracted.

Next, in step S3002, the central processing unit of the chat service 600 refers to the simple reaction reply information included in the posted contents to be extracted. The chat service 600 holds the "MessageID", text sentences, an entity file of the bitmap images, link information of the attached image, the simple reaction reply information, and thread configuration information between posts described in FIG. 6, which are referred to in steps S3001 and S3002.

Then, in step S3003, the central processing unit of the chat service 600 refers to the attachment information included in the posted contents to be extracted and requests the file information to the cloud storage service 400.

Then, in step S3004, the central processing unit of the chat service 600 refers to the reply information associated with the post.

Next, in step S3005, the central processing unit of the chat service 600 confirms whether or not the reply information (reply) associated with the post exists. If the reply information exists (No in step S3005), the central processing unit of the chat service 600 returns the process to step S3001 and repeats the processing. On the other hand, if the reply information does not exist (Yes in step S3005), the central processing unit of the chat service 600 advances the process to step S3006.

In step S3006, the central processing unit of the chat service 600 converts the posted contents to be extracted, which have been referred to in steps S3001 to S3005, into data in the JSON format as shown in FIG. 6.

Next, in step S3007, the central processing unit of the chat service 600 transmits the JSON format data generated in step S3006 to the plugin service 700 of the requesting party as a response to the request, and terminates the processing of this flowchart.

As described above, if the request to obtain chat information included in the posted contents to be exported is received from the plugin service 700 in step S103 of FIG. 8, the chat service 600 extracts the chat information by referring to the chat information management unit 602 managed by the chat service 600. The chat service 600 responds to the plugin service 700 with the extracted information along with the attachment information. At this time, the attachment information is responded to with the result of an inquiry to the cloud storage service 400 holding the entity of the attachments. In the flowchart of FIG. 13, it is assumed that the user selects "messageAll" as described in FIG. 6, and the chat service 600 collectively extracts all the posts referring to the posted contents selected by the user. Note that if the posts are traced one by one by the user selecting "replies", the same processing can be achieved by eliminating step S3005 and repeating step S1001 (contents information request) in FIG. 10 until there are no reference threads.

As described above, the processing for extracting the contents information is performed by the chat service 600.

<The Flowchart of the Processing for Printing the Contents Information>

Figure 14:
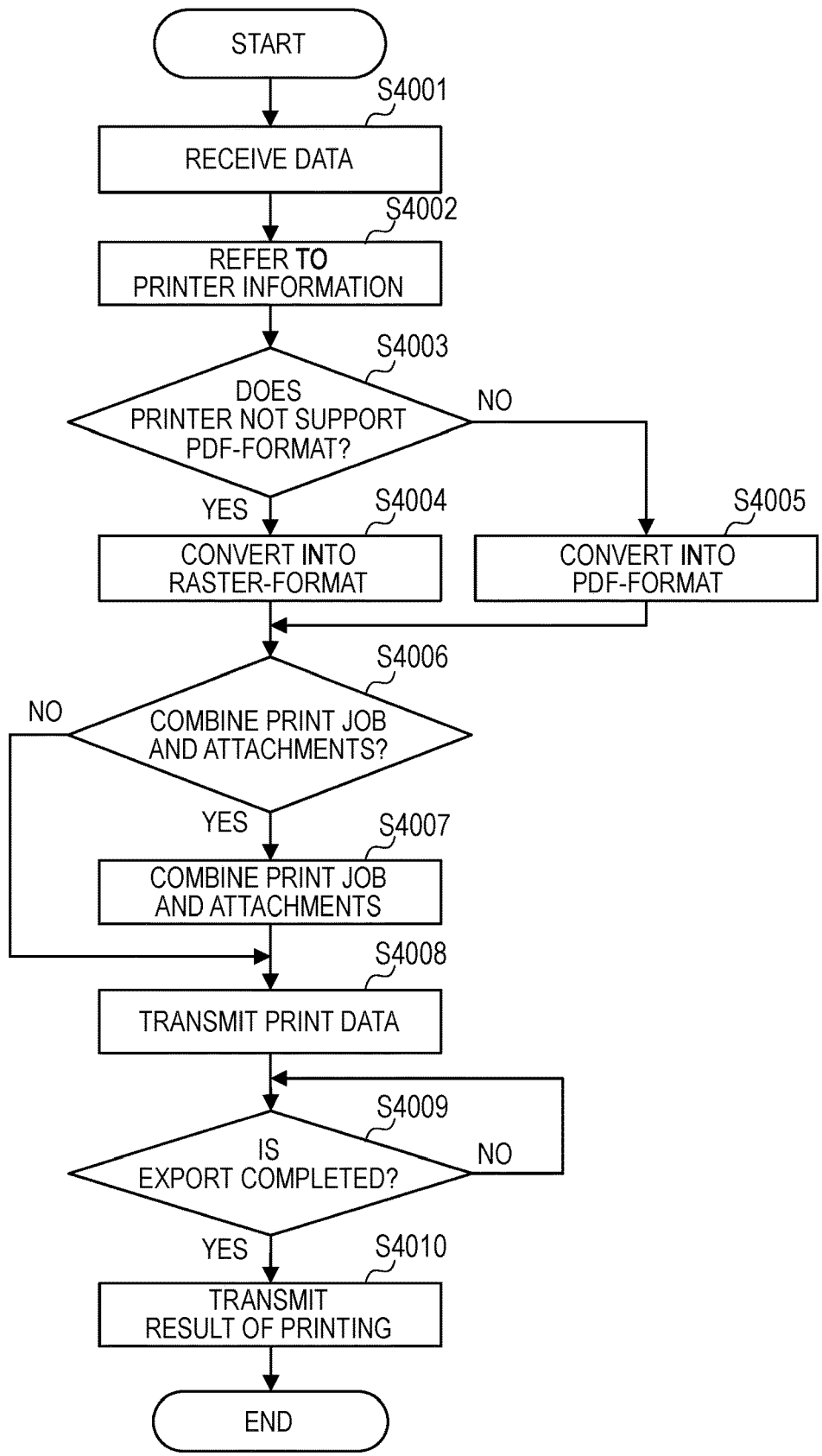
FIG. 14 illustrates a flowchart showing a printing processing for content information.

FIG. 14 illustrates a flow chart showing an example of the processing for printing contents information by the cloud print service 500. The processing of the flowchart is realized by a central processing unit (not shown) of the cloud print service 500 loading and executing a program stored in an auxiliary storage unit (not shown) into a main storage unit (not shown).

If the data to be printed is transmitted from the plugin service 700 to the cloud print service 500 in step S212 of FIG. 9, the central processing unit of the cloud print service 500 starts the processing of the flowchart.

First, in step S4001, the central processing unit of the cloud print service 500 receives the print data transmitted from the collaboration tool 300. Then, in step S4002, the central processing unit of the cloud print service 500 refers to the target printer information and obtains the print data format supported by the target printer.

Then, in step S4003, the central processing unit of the cloud print service 500 confirms whether or not the input printer can print the data in PDF format (PDF is not supported by the input printer). If the PDF format cannot be printed (Yes in S4003), the central processing unit of the cloud print service 500 advances the process to step S4004. On the other hand, if the PDF format can be printed (No in step S4003), the central processing unit of the cloud print service 500 advances the process to step S4005.

In step S4004, the central processing unit of the cloud print service 500 reads the print data received in step S4001, rasterizes and converts the print data into Raster data. It should be noted that body parts, such as text sentences or bitmap images, and the attachment parts are converted as separate data. After the processing in step S4004, the central processing unit of the cloud print service 500 advances the process to step S4006.

In step S4005, the central processing unit of the cloud print service 500 converts the received print data into the PDF format data. In the present embodiment, the plugin service 700 converts the posted contents to be exported to the PDF format in step S2003 of FIG. 11 (the detailed process of step S2003 is shown in FIG. 12). The converted data is generated with the attachments embedded in the PDF data. Assuming that the target printer supports the PDF format as a printable data format and does not support the printing of such embedded files, this step is configured to convert the embedded files into PDF data. Also in this step, the body parts such as text sentences and bitmap images, and the attachment parts are converted as separate data. After the processing in step S4005, the central processing unit of the cloud print service 500 advances the process to step S4006.

In step S4006, the central processing unit of the cloud print service 500 determines whether or not to print (to combine the job) the body, such as text sentences and bitmap images, included in the data to be printed and attachments in the same job. At this time, the information specified in a print setting UI item (not shown) is referred to for determination. If the print processing is performed by the same job (Yes in step S4006), the central processing unit of the cloud print service 500 advances the process to step S4007. On the other hand, if the print processing is not performed by the same job (No in step S4006), the central processing unit of the cloud print service 500 advances the process to step S4008. If it is determined in step S4006 that the job is not to be combined, the body and the attachments are transmitted to the printer as separate print jobs. On the other hand, if it is determined that the job is to be combined, the body and the attachments are combined into one job and transmitted to the printer.

In step S4007, the central processing unit (not shown) of the cloud print service 500 combines the print data converted in step S4004 or S4005 as one data and advances the process to step S4008.

In step S4008, the central processing unit of the cloud print service 500 transmits the print data to the printer 200 that performs the printing process.

Next, in step S4009, the central processing unit of the cloud print service 500 determines whether or not the print processing (export) is completed by the input printer 200. If the printing process is not yet completed (No in step S4009), the central processing unit of the cloud print service 500 repeats the process again. On the other hand, if the printing process is completed (Yes in step S4009), the process proceeds to step S4010.

In step S4010, the central processing unit of the cloud print service 500 responds to the plugin service 700 with the result of the print processing by the printer 200 that is the target destination of the print job, and terminates the processing of this flowchart.

As described above, if the cloud print service 500 receives the data to be printed that are transmitted from the plugin service 700 in step S212 of FIG. 9, the cloud print service 500 converts the data into data in a format printable by the printer 200 and transmits the print job to the printer 200. There are the printers 200 that can print directly the PDF format and the printers 200 that can print the PDF format only after converting the received data to the Raster format. The conversion data is switched according to the information of the printer. In the present embodiment, the posted contents extracted once in step S2003 of FIG. 11 are converted into the PDF format. The attachments are embedded and stored as data in other formats inside the PDF data (step S2103 of FIG. 12).

Assuming that the input printer supports the PDF format as a printable data format and does not support printing of the embedded files, the embedded files are converted into PDF data in step S4005. If the printer can print the embedded file as described above, the step of step S4005 may be skipped. Further, if the body parts and the attachment parts are printed simultaneously, the user can select whether the body parts such as text sentences and bitmap images are to be included together with the attachment parts in the same print job, or to be separated from the attachment parts. The user can select whether the same print job is to include the body parts together with the attachment parts or not via UI settings (not shown). If the print job includes the body parts and the attachment parts, the print job is transmitted to the printer 200 after combining the body parts and the attachment parts. The job-combining process may be configured so that the plurality of jobs are combined, or the plurality of jobs are not combined.

As described above, the processing for printing the contents information is performed by the cloud print service 500.

In the above description, the cloud print service 500 controls whether the body parts and the attachment parts are included in one print job or two or more print jobs. The plugin service 700 may control whether the body parts and the attachment parts are included in one print job or two or more print jobs. For example, in the print setting screen U600 shown in FIG. 5B, a checkbox is provided for setting whether or not to combine jobs. The plugin service 700 first converts the body parts to the data in the PDF format. This process is similar to in the process of step S1201 shown in FIG. 12. The plugin service 700 determines whether or not to print the attachments according to the setting set in the checkbox U602 of the print setting screen U600. If the plugin service 700 prints the attachments, the plugin service 700 converts file formats of the attachments into the PDF format. Next, the plugin service 700 determines whether to export the body parts and the attachment parts as one print job or two or more print jobs according to the settings made via the checkbox (not shown) described above. If the plugin service 700 exports the body parts and the attachment parts as one print job, the plugin service 700 adds the PDF data obtained by converting the attachment parts to the end of the PDF data obtained by converting the body parts. Based on the foregoing processing, the plugin service 700 can export the body parts and attachment parts as one PDF file and one print job.

<The Output Image of the Export Data>

FIGS. 15A to 15D illustrate output images exported in the present embodiment. Hereafter, FIGS. 15A to 15D are collectively referred to as "FIG. 15". The output images shown in FIG. 15 are drawing results for previewing via a PDF viewer software if the posted contents and the attachments are exported as PDF data. If the posted contents and the attachments are transmitted to the printer 200 as a print job, the posted contents and the attachments are printed similarly to the output image shown in FIG. 15. In FIG. 15, the output image of the attachments is omitted. If the attachments are selected to execute the printing, the output image of the attachments may be previewed and output following the output image shown in FIG. 15. For example, an output image of "AAA.pptx" is output first, and followed by an output image of "BBB.xlsx".

Figure 15A:
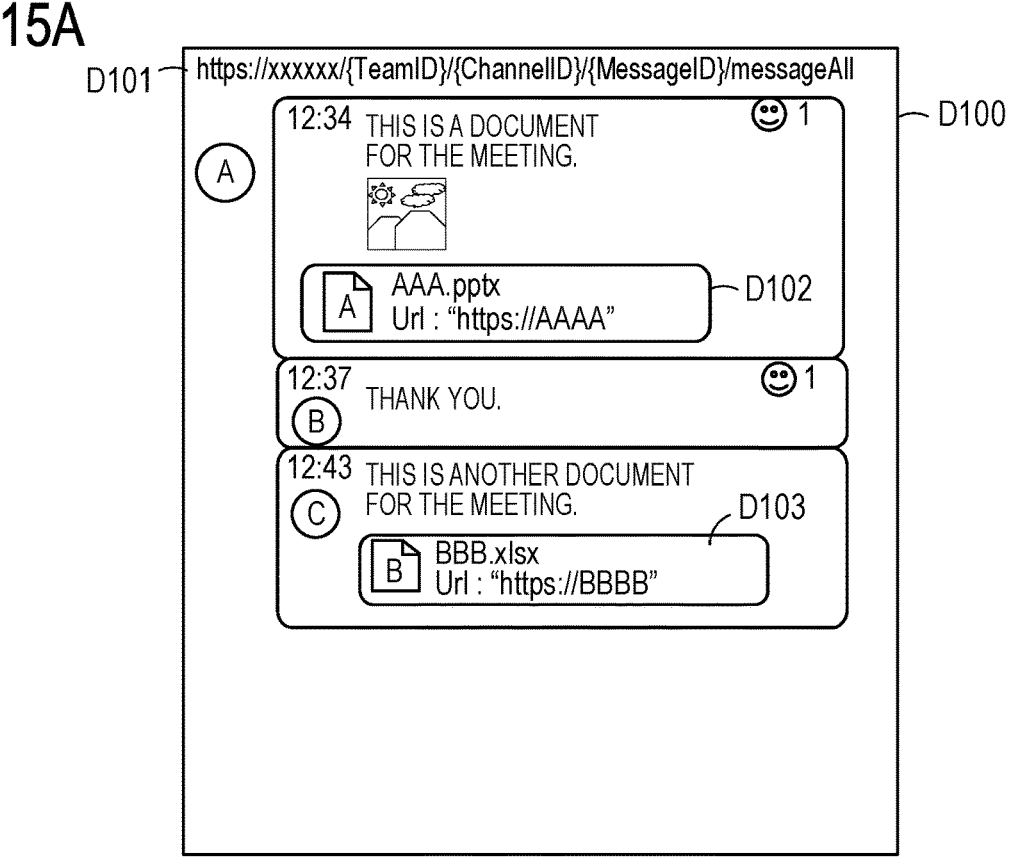
FIG. 15A illustrates an output image of export data.

Each output image will be described in detail below. First, as described in FIG. 4A, FIG. 15A illustrates an output image D100 if the user gives an instruction of the exporting via the three-point reader menu of the parent post U101, which is a first post in the threaded form. In this case, the posts to be extracted are all the posts and all the attachments included in the thread.

In the threaded form, attachments D102 and D103 are arranged on each post, respectively. The user can recognize that each attachment is attached to each post with a file name and a URL. Further, the URL D101 including the "MessageID" that identifies the posted contents may be arranged on the output image so that the user can recognize which post is extracted.

Figure 15B:
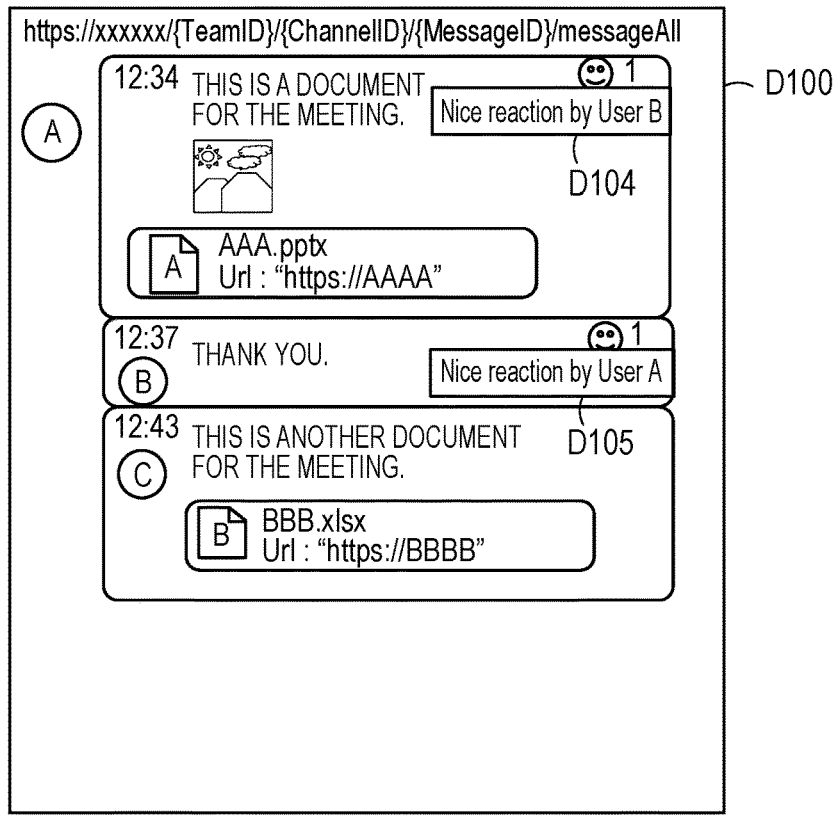
FIG. 15B illustrates an output image of export data.

FIG. 15B similarly illustrates an output image including all the posted contents and all the attachments but illustrates a drawing result if making a setting to display the annotation attribute object as a PDF preview or a printing function. Annotation information D104 and D105 indicating which user replied with the simple reply information is displayed.

Figure 15C:
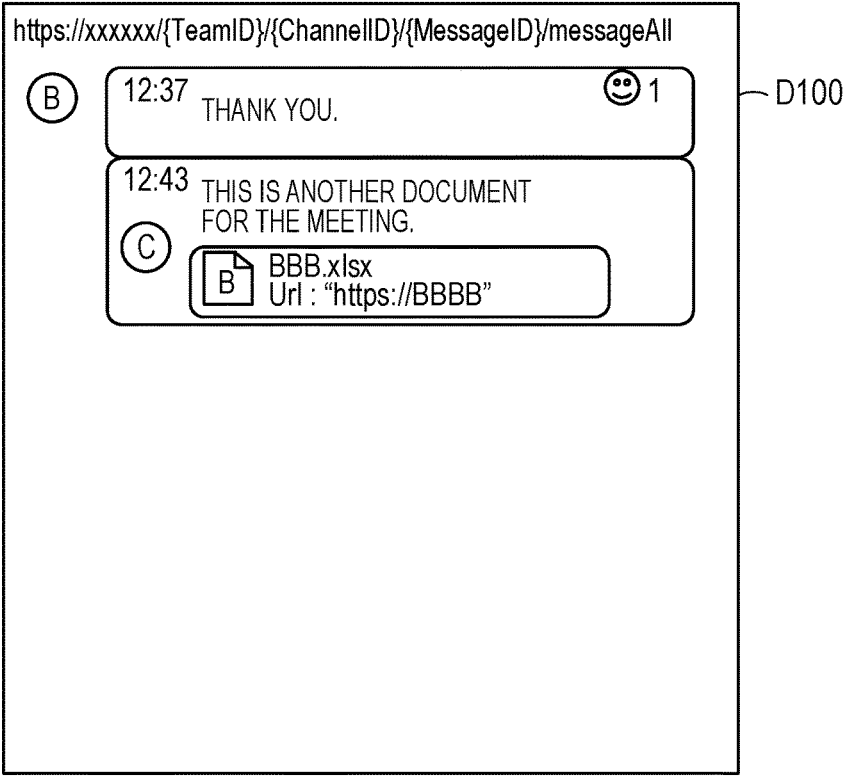
FIG. 15C illustrates an output image of export data.

FIG. 15C illustrates a drawing result if the user gives an instruction of the exporting via the three-point reader menu of the post U105 in the middle of the posted thread, as described in FIG. 4B. The posts included in the drawing result are only text sentences, captured images, the simple reaction reply information, and attachments included in the post U105 and the reference post U107.

Figure 15D:
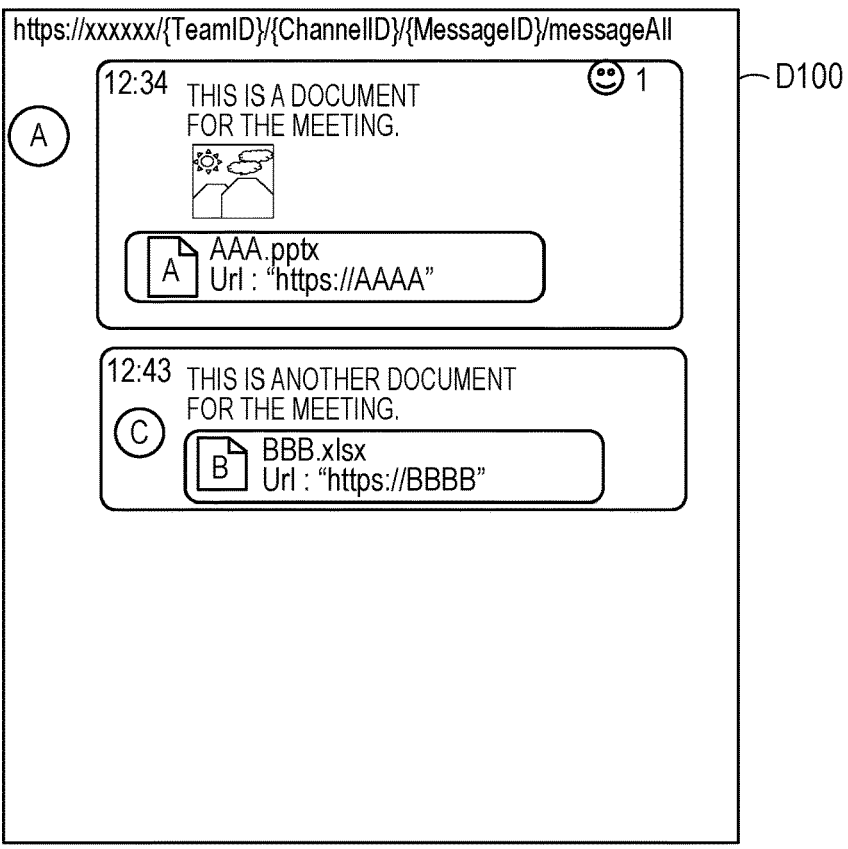
FIG. 15D illustrates an output image of export data.

FIG. 15D further illustrates drawing results if the user selects the posts and the attachments to be exported from the list of posts shown in FIGS. 5C and 5D. Only the text sentences, the bitmap images, the simple reaction reply information, and the attachments to the posts selected in the "Targ" field of FIGS. 5C and 5D will be exported.

The output images shown in FIG. 15 are only examples, and the present disclosure is not limited to these examples. For example, because the information of the URL identifying the attachments and the posted threads is also the annotation attribute object, the annotation attribute object may be controlled to be drawn only if the information is specified as an annotation attribute object such as the simple reaction reply information D104 and D105 and the annotation display function is enabled. The layout of each post may be changed as needed so that the user can recognize the relationship of each post in the thread. The present embodiment is not limited to this layout.

As described above, the system according to the present embodiment provides buttons in the UI on a collaboration tool that can be used to instruct an export of text information, bitmap images, and simple reaction reply information shared as communication information on the collaboration tool. Each of these export instruction buttons is arranged to target an individual post shared on the collaboration tool. If the export instruction is given by selecting the button, the system extracts posted contents included in the target post and outputs the posted contents as export data.

In the present embodiment, a format of exchanging communication information on collaboration tools is not a format of one-to-one conversations, but a threaded format in which the progress of a plurality of conversations is organized in a tree structure. In a case where communications are organized in the tree structure, subsequent posts often conclude the conversation. If the user wants to extract only the conclusions, it may be preferable that only the subsequent posts are target of the extraction. Therefore, if exporting the communication information on the collaboration tool to the outside, in a case where the post to be extracted is arranged in the middle of the tree structure, only the contents posted after the post that the user instructs to export are extracted. The contents posted before the post that the user instructs to export are not extracted based on the tree structure.

Information extracted in the present embodiment is not limited to various document data such as Microsoft Office® and PDF formats shared on a cloud storage of collaboration tools. Textual information shared as communication information, bitmap images and the simple reaction reply information are also included in the extracted information. However, the bitmap images and the simple reaction reply information are not always required. In some cases, only one of the bitmap images and the simple reaction reply information may be extracted. Therefore, the user can select whether to extract the document data shared on the cloud storage together with the communication information or not, and the user can extract selectively the communication information.

Further, the extracted communication information is converted into data on the collaboration tool and exported as export data. If the user wants to print the communication information, the data is transmitted to the cloud print service. Here, if the PDF format is adopted as export data or print data, the simple reaction reply information is converted as an annotation attribute object. The simple reaction reply information can only be expressed as annotation information on the collaboration tool. For example, the simple reaction reply information is often an understatement that pops up only if the mouse cursor is over the simple reaction reply information.

Because the annotation information need not always be expressed, it is desirable that, in the expression of the PDF data, the annotation information may be expressed as an annotation object that can be changed whether it is displayed or not in the preview/print settings.

In the above embodiment, if the user selects download in the menu U300, the export data converted from messages and the like is transmitted to the client computer 100. The user may specify the storage destination in the setting screen of FIG. 5A, and the export data converted from the message or the like may be transmitted to the specified storage destination. Furthermore, the data format such as PDF or XPS may be specified in the setting screen of FIG. 5A, and the export data may be converted into the specified data format.

The present embodiment is not limited to the structure and contents of the various data described above, and the data includes various structures and contents according to the uses and purposes.

Although one embodiment has been described above, the present disclosure can be implemented as a system, apparatus, method, program or storage medium, for example. Specifically, it may be applied to a system consisting of multiple devices, or it may be applied to an apparatus consisting of a single device. Further, all of the configurations in which the above examples are combined are also included in the present disclosure.

According to the present embodiment, the communication information shared by a service with a message posting function such as a collaboration tool can be collectively exported to the outside. This enables export text information stored in a chat format, bitmap images, and the simple reaction reply information other than document data shared on collaboration tools, thus preventing the omission of communication information. As a result, the usability in communications using collaboration tools can be improved.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-210376, filed Dec. 24, 2021, which is hereby incorporated by reference herein in its entirety.

What is claimed is:

1. A method of controlling a plugin server apparatus that receives an event from a chat server apparatus that provides a chat service, wherein the plugin server apparatus is provided as an intermediary bridge from a collaboration tool to said chat server apparatus, the method comprising:

receiving, from said chat server apparatus via the collaboration tool, a message selected by a user from among messages posted to the chat service provided by said chat server apparatus, wherein the message is selected as a print target;

transmitting, from the plugin server to said chat server apparatus, a request for exporting the contents of the selected message, wherein the request for exporting the contents of the selected message is transmitted from the plugin server apparatus to the chat server apparatus using the GET method of HTTP;

receiving, at the plugin server apparatus from said chat server apparatus, information on a file associated with the selected message, wherein the information includes a URL indicating where in a cloud storage server the associated file is stored, where the storage server provides a cloud storage service;

obtaining, by the plugin server apparatus from the cloud storage server, the file associated with the selected message, wherein the file is obtained using the URL; and generating, by the plugin server apparatus, data for transmission to a print server, wherein the data includes the selected message and the obtained file associated with the selected message, and wherein the print server provides a cloud print service; and transmitting the generated data from the plugin server to the print server, wherein the print server receives the generated data and transmits the received data to a printer, wherein in response to the request for exporting the contents of the selected message transmitted from the plugin server apparatus to the chat server apparatus, the chat server apparatus sends a request to the cloud server for the information on the file associated with the selected message, receives the URL of the associated file from the cloud storage server, and sends contents of the selected message in a JSON format together with the information of the file associated with the selected message to the plugin server apparatus.

2. The method according to claim 1, further comprising: obtaining another message associated with the selected message, wherein in the generating of data for transmission to a print server, the data includes the other message.

3. The method according to claim 2, wherein the other message is a message posted as a reply to the selected message.

4. The method according to claim 1, further comprising: obtaining annotation information associated with the selected message, wherein the generated data includes the annotation information.

5. The method according to claim 4, wherein the annotation information includes object information transmitted by specifying the message.

6. The method according to claim 5, wherein the annotation information includes user identification information of a user instructing to transmit the object information.

7. The method according to claim 1, wherein the format of the generated data includes a Portable Document Format (PDF).

8. A non-transitory computer-readable storage medium storing program to cause a computer to perform a method of controlling a plugin server apparatus that receives an event from a chat server apparatus that provides a chat service, wherein the plugin server apparatus is provided as an intermediary bridge from a collaboration tool to said chat server apparatus, the method comprising:

receiving, from said chat server apparatus via the collaboration tool, a message selected by a user from among messages posted to the chat service provided by said chat server apparatus, wherein the message is selected as a print target;

transmitting, from the plugin server to said chat server apparatus, a request for exporting the contents of the selected message, wherein the request for exporting the contents of the selected message is transmitted from the plugin server apparatus to the chat server apparatus using the GET method of HTTP;

receiving, at the plugin server apparatus from said chat server apparatus, information on a file associated with the selected message, wherein the information includes a URL indicating where in a cloud storage server the associated file is stored, where the storage server provides a cloud storage service;

obtaining, by the plugin server apparatus from the cloud storage server, the file associated with the selected message, wherein the file is obtained using the URL; and generating, by the plugin server apparatus, data for transmission to a print server, wherein the data includes the selected message and the obtained file associated with the selected message, and wherein the print server provides a cloud print service; and transmitting the generated data from the plugin server to the print server, wherein the print server receives the generated data and transmits the received data to a printer, wherein in response to the request for exporting the contents of the selected message transmitted from the plugin server apparatus to the chat server apparatus, the chat server apparatus sends a request to the cloud server for the information on the file associated with the selected message, receives the URL of the associated file from the cloud storage server, and sends contents of the selected message in a JSON format together with the information of the file associated with the selected message to the plugin server apparatus.

9. The non-transitory computer-readable storage medium according to claim 8, wherein the method further comprises:

obtaining another message associated with the selected message, wherein in the generating of data for transmission to a print server, the data includes the other message.

10. The non-transitory computer-readable storage medium according to claim 9, wherein the other message is a message posted as a reply to the selected message.

11. The non-transitory computer-readable storage medium according to claim 8, wherein the method further comprises:

obtaining annotation information associated with the selected message, wherein the generated data includes the annotation information.

12. The non-transitory computer-readable storage medium according to claim 11, wherein the annotation information includes object information transmitted by specifying the message.

13. The non-transitory computer-readable storage medium according to claim 12, wherein the annotation information includes user identification information of a user instructing to transmit the object information.

14. The non-transitory computer-readable storage medium according to claim 8, wherein the format of the generated data includes a Portable Document Format (PDF).

15. A control method of a chat system, comprising:

providing a plugin service as an intermediary bridge from a collaboration tool to a chat server providing a chat service, a storage server providing a cloud storage service, and a print server providing a cloud print service;

receiving, at the plugin server from the collaboration tool, a message selected by a user from among messages posted to the chat server;

transmitting, from the plugin server to the chat server, a request for exporting the contents of the selected message, wherein the request for exporting the contents of the selected message is transmitted from the plugin server to the chat server using the GET method of HTTP;

receiving, at the plugin server from the chat server, information on a file associated with the selected message, wherein the information includes a URL indicating where in the cloud storage server the associated file is stored;

obtaining, by the plugin server from the cloud storage server, the file associated with the selected message, wherein the file is obtained using the URL; and generating, by the plugin server, data for transmission to the print server, wherein the data includes the selected message and the obtained file associated with the selected message; and transmitting the generated data from the plugin server to the print server, wherein the print server receives the generated data and transmits the received data to a printer, wherein in response to the request for exporting the contents of the selected message transmitted from the plugin server to the chat server, the chat server sends a request to the cloud server for the information on the file associated with the selected message, receives the URL of the associated file from the cloud storage server, and sends contents of the selected message in a JSON format together with the information of the file associated with the selected message to the plugin server.

16. The control method according to claim 15, wherein the data generated by the plugin server for transmission to the print server is generated in one or more than one of a Portable Document Format (PDF) format, a format compressing JSON format, bitmap images, and documents in a zip-file format into a single piece of data.

* * * * *